United States Patent
Scheuble et al.

(10) Patent No.: US 6,327,010 B1
(45) Date of Patent: Dec. 4, 2001

(54) ELECTROOPTICAL SYSTEM

(75) Inventors: Bernhard Scheuble, Seeheim; Günter Baur, Freiburg; Waltraud Fehrenbach, Emmendingen; Barbara Staudacher, Ettenheim, all of (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 08/769,517

(22) Filed: Dec. 19, 1996

Related U.S. Application Data

(63) Continuation of application No. 07/828,904, filed on Feb. 3, 1992.

(51) Int. Cl.$^7$ .................................................. G02F 1/1335
(52) U.S. Cl. ............................. 349/118; 349/99; 349/102; 349/180; 349/181
(58) Field of Search ............................. 349/99, 102, 103, 349/117, 180, 118, 120, 179, 181

(56) References Cited

U.S. PATENT DOCUMENTS

| | | |
|---|---|---|
| 3,680,950 | 8/1972 | Haas et al. . |
| 3,821,720 | 6/1974 | Groubel et al. . |
| 4,068,925 | 1/1978 | Tani et al. . |
| 4,252,417 | 2/1981 | Scheffer et al. . |
| 4,326,279 | 4/1982 | Shanks . |
| 4,952,030 | 8/1990 | Nakagawa et al. . |
| 4,973,138 | 11/1990 | Yamazaki et al. . |
| 5,182,664 | 1/1993 | Clerc . |
| 5,249,070 | 9/1993 | Takano . |
| 5,280,375 | 1/1994 | Tsuda et al. . |
| 5,477,358 | 12/1995 | Rosenblatt et al. . |

FOREIGN PATENT DOCUMENTS

| | | |
|---|---|---|
| 2531806 | 1/1976 | (DE) . |
| 2007865 | 5/1979 | (GB) . |

OTHER PUBLICATIONS

Baur et al., "Electrooptic Properties of Some Twisted Structures," Apr. 4, 1990.

Toko, Y. et al., "TN–LCDs Fabricated by Non–Rubbing Showing Wide and Homogeneous Viewing Angular Characteristics and Excellent Voltage Holding Ratio," SID 93 Digest, pp. pp. 622–625 (1993).

Ogawa et al., "New Electro–Optical Effect: Optical Activity of Electric–Field–Induced Twisted–Nematic Liquid Crystal," Electronics Letters, vol. 12, No. 3, pp. 70–71 (1976).

Brokx & Vetogen, "On the Field–Induced Cholesteric–Nematic Transition in Cholesteric Liquid Crystals with Homeotropic Boundary Conditions," Z. Naturforsch, 38a, pp. 1–9 (1983).

Greubel et al., "Electric Field Induced Texture Changes in Certain Nematic/Cholesteric Liquid Crystal Mixtures," Molecular Crystals and Liquid Crystals, vol. 24, pp. 103–111 (1973).

Greubel, Bistability Behavior of Texure in Cholesteric Liqued Crystals in an Electric Field, Appl. Phys. Lett., vol. 25, No. 1, pp. 5–7 (1974).

Gerber, "Voltage–Induced Cholesteric Structure–Transformation in Thin Layers," Z. Naturforsch, 36a, pp. 718–776 (1981).

Gray, "Dyestuffs and Liquid Crystals," Chimia, 34 No. 2, pp. 47–58 (1980).

*Primary Examiner*—Kenneth Parker
*Assistant Examiner*—Tai V. Duong
(74) *Attorney, Agent, or Firm*—Millen, White, Zelano & Branigan, P.C.

(57) ABSTRACT

An electrooptical system contains:
(a) a twisted nematic liquid-crystal layer, with an input side and an output side, which is positioned between a first substrate and a second substrate, each of whose inside surface is provided with an electrode coating and an alignment layer thereon, the director of said liquid crystal layer having a parallel edge alignment and a twist angle of $0° \leq \beta \leq 1000$, (b) at least one compensation layer for compensating the optical path difference of the liquid-crystal layer d·Δn, and
(c) at least one device for linear polarization of light in such an arrangement that light, before entering and after exiting the liquid-crystal layer, passes through a polarization device,
   I. wherein, in order to achieve high contrast, and/or high brightness, and/or high viewing angle independence of the contrast and/or the color values, the angle ψ, which the polarization device on the input side of the liquid crystal layer forms with the director of the liquid-crystal molecules on the surface of the first substrate, satisfies
   I.A. condition (1) or (2)

$$\psi=(\beta+90°)/2\pm10° \quad (1)$$

$$\psi=\beta/2\pm10° \quad (2)$$

Figure 1A:
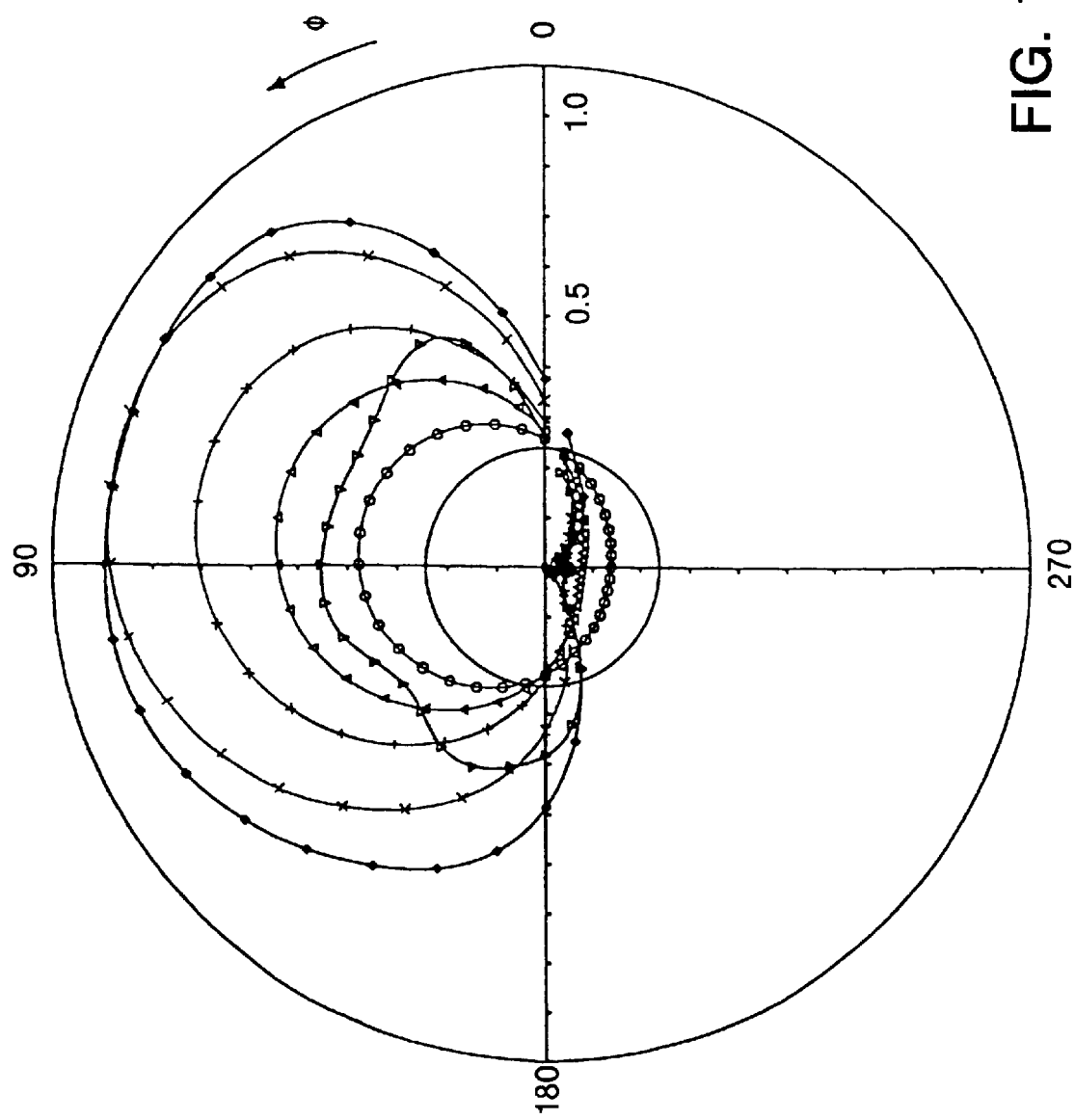

where a polarization device is present on both the light input side of the liquid crystal layer and the light output side of the liquid crystal layer, and the polarization device on the output side of the liquid crystal layer is rotated by 90°±10° with respect to the polarization device on the input side of the liquid crystal layer, and, optionally, alignment of the polarization devices on the input side and the output side of the liquid crystal layer are interchanged, or satisfies I.B. condition (3) or (4)

$$30°\leq\psi\leq70° \text{ for } 0\leq\beta\leq45° \quad (3)$$

$$35°\leq\psi\leq90° \text{ for } 45\leq\beta100° \quad (4),$$

where a polarization device is only present on the input side,
   II. wherein the compensation layer comprises a material having three optical refractive indices, of which one is less than the other two, and wherein the optical axis corresponding to this lowest refractive index is essentially parallel to the surface of said second substrate or forms an angle of 2°<γ<60° with the surface of said second substrate,
   as a result of which, the angle between the optical axis of the compensation layer and the optical axis of the liquid-crystal layer, upon application of a voltage, passes through a minimum, and
   III. wherein the plane set up by the two other refractive indices forms an angle of between 30° and 150° with the director of the liquid-crystal at the surface of the second substrate.

7 Claims, 22 Drawing Sheets

ELECTROOPTICAL SYSTEM

This application is a continuation of Ser. No. 07/828,904 filed Feb. 3, 1992.

The invention relates to an electrooptical system as defined in the preamble of claim 1.

Important criteria for assessing the optical properties of electrooptical systems are the values achieved for contrast brightness viewing angle dependence of the contrast and viewing angle dependence of the colour values.

Initially TN displays (twisted nematic) were operated in the so-called Mauguin region ($d \cdot \Delta n \gg \lambda$), as indicated, for example, in IEEE Transaction and Electron Devices, 25 (1978), 1125–1137. In this region, the polarisation vector of the incident light in the visible spectral region follows the helical structure of the unaddressed cell, irrespective of thickness variations in the cell. However, displays of this type have an extremely high viewing angle dependence of the contrast and thus a greatly limited observation angle range.

A decisive improvement in the viewing angle dependence of the contrast is observed if the system has a value for the product of birefringence $\Delta n$ and layer thickness d of the liquid crystal in the range $0.150 \, \mu m \leq d \cdot \Delta n \leq 0.600 \, \mu m$ indicated in DE 30 22 818. This system has the disadvantage that, according to Electronics Letters, 10 (1974), 2–4, a barrier behaviour which is dependent on the cell thickness and wavelength is produced in the sub-Mauguin region, which can result in a certain brightening in the voltage-free state.

U.S. Pat. No. 4,443,065 proposes a double-cell arrangement in which one cell is addressed electrically and used for information display while the other cell serves to compensate the optical path difference $d \cdot \Delta n$ of the switched cell. However, arrangements of this type frequently have inadequate values for contrast and brightness as a consequence of the additional liquid-crystal layer.

In electrooptical systems based on ECB (electrically controlled birefringence) or DAP (distortion of aligned phases) effect, the liquid-crystal molecules have a negative dielectric anisotropy $\Delta \epsilon$, a homeotropic edge alignment and an untwisted structure as described, for example, in Displays 7 (1986), 3. It has been proposed that the observation angle range can be broadened by using compensation layers based on polymer films (EP 0 239 433 and EP 0 240 379) or liquid-crystal layers (DE 39 11 620) having negative optical anisotropy. The electrooptical properties of such compensated ECB systems are frequently impaired by inadequate values for contrast and brightness.

The object of the present invention was therefore to provide electrooptical systems, based on the TN or ECB effect and containing one or more compensation layers, which are distinguished by improved electrooptical properties and in particular by high values for the contrast and/or brightness and/or viewing angle dependence of the contrast and/or colour values. It has been found that this object can be achieved by the provision of the elctrooptical systems according to the invention.

The invention thus relates to electrooptical systems containing a tristed nematic liquid-crystal layer between 2 substrates whose insides are provided with electrode coatings and alignment layers thereon, the liquid crystal having a parallel edge alignment and a twist angle of $0 \leq \beta \leq 100°$ and in particular $0 \leq \beta \leq 90°$ or a homeotropic edge alignment, one or more layers for compensating the optical path difference of the liquid-crystal layer $d \cdot \Delta n$, and at least one device for linear polarisation of the light in such an arrangement that the light, before entering and after exiting the liquid-crystal layer, passes through a polarisation device at least once in each case, characterised in that, in order to achieve high contrast and/or high brightness and/or high viewing angle independence of the contrast and/or the colour values, the angle $\psi$ which the polarisation device forms on the input side with the preferential direction of the liquid-crystal molecules on the first substrate surface satisfies condition (1) or (2)

$$\psi = (\beta + 90°)/2 \pm 10° \quad (1)$$

$$\psi = \beta/2 \pm 10° \quad (2)$$

if a polarisation device is present on both the input side and the output side, the polariser on the output side being rotated by $90° \pm 10°$ with respect to the polariser on the input side, and it also being possible for the alignment of the polarisers on the input side and the output side to be interchanged, or satisfies condition (3) or (4)

$$30° \leq \psi \leq 70° \text{ for } 0 \leq \beta \leq 45° \quad (3)$$

$$35° \leq \psi \leq 90° \text{ for } 45° \leq \beta \leq 100° \quad (4)$$

if a polarisation device is only present on the input side.

The formulation used in equations (1) and (2) is intended to indicate that deviations of up to $\pm 10°$ from the angle $\psi$ given by the equations $$\psi = (\beta + 90°)/2$$

$$\psi = \beta/2$$

are possible. However, the deviations from the optimum angles $\psi = (\beta + 90°)/2$ or $\psi = \beta/2$ are preferably not greater than $\pm 7.5°$ and in particular less than $\pm 5°$.

In arrangements having a polarisation device on both the input side and the output side, the polariser on the output side is rotated by $90° \pm 10°$ with respect to the polariser on the input side, this formulation again indicating that deviations of up to $\pm 10°$ from the optimum angle of $90°$ are possible. However, the deviations from the optimum rotation of the rear polariser are preferably not greater than $7.5°$ and in particular less than $\pm 5°$.

The alignments of the front and rear polarisers may also be interchanged; i.e. if the alignment of the polariser on the input side is given by $\psi$ and the alignment of the polariser on the output side is given by $\psi'$, the alignment of the polariser on the input side in another arrangement can be given by $\psi'$ and the orientation for the polariser on the output side can be given by $\psi$. The arrangements described by equations (1) and (2) and the arrangements given by interchanging the polariser alignments are preferred.

The electrooptical systems according to the invention contain an addressable liquid-crystal layer which is arranged between plane-parallel, transparent substrates whose insides are provided with electrode coatings and alignment layers thereon. The electrodes comprise, for example, thin, planar and transparent indium-tin oxide (ITO) or indium oxide coatings. To produce the edge alignment of the liquid crystals, polymer layers, for example polyimide or polyvinyl alcohol layers, which have been given a uniform alignment by rubbing, if desired with simultaneously application of pressure, are generally used. In addition, alignment layers can also be obtained by vapour-deposition of inorganic materials, such as, for example, silicone oxide or magnesium fluoride. A review of the various alignment techniques is given, for example, in Thermotropic Liquid Crystals, G. W. Gray (ed.), pp. 75–77.

If the liquid-crystal layer is operated in accordance with the TN principle, the liquid crystals have a parallel edge alignment, usually with a small pretilt angle in the order of, for example, from 1° to 10°. If, by contrast, the liquid-crystal layer is based on the ECB principle, the liquid-crystal molecules have a homeotropic edge alignment and are usually tilted against the perpendiculars at a small pretilt angle of, for example, 0.5–5°.

In TN liquid-crystal layers, the twist angle, which is between 0° and 100° and in particular between 0° C. and 90°, is usually defined by the alignment of the alignment layers. However, it is also possible for the twist angle $\beta$ to be given by a cholesteric pitch of the liquid crystal. Even if the twist angle is not set via the pitch of the liquid crystal, a chiral dope is generally added in a low concentration in order to prevent reverse twist and reverse tilt, as described, for example, in DE 25 07 524.

In conventional ECB liquid-crystal layers, the liquid-crystal molecules are essentially untwisted. By contrast, the ECB liquid-crystal layer in the electrooptical systems according to the invention can have a twist of $0°<\beta\leq 90°$, it being possible for the twist angle $\beta$ to be defined by the alignment of the alignment layers and/or by the cholesteric pitch of the liquid crystal. ECB liquid-crystal layers having a twisted structure and electrooptical systems containing an ECB liquid-crystal layer of this type are novel and preferred and are the subject-matter of this invention.

In addition to this liquid-crystal layer, the electrooptical systems according to the invention may contain one or more, preferably not more than 2 and in particular one, compensation layer. The compensation layers may be based on low-molecular-weight liquid crystals, liquid-crystalline polymers or thermoplastic polymers, which are, for example, stretched 2-dimensionally and are thus made optically uniaxial.

The use of compensation layers is based on a well-known physical principle, which is also achieved, for example, in the Babinet-Soleil compensator. Two optically uniaxial media, for example, which have essentially the same optical path difference $d \cdot \Delta n$, are combined, but the optical axes of the two media are perpendicular to one another. Linear-polarised light whose polarisation direction is not in the direction of the optical axis is split in the first medium into an ordinary ray and an extraordinary ray. Since the optical axes of the two media are perpendicular to one another, the ordinary ray of the first medium passes through the second medium as an extraordinary ray and vice versa. The optical path difference in the first medium is $d \cdot (n_e - n_o)$ and in the second medium, by contrast, is $d \cdot (n_o - n_e)$, so that the overall difference is 0 and the system comprising the two optical uniaxial media has no birefringence. These considerations can be applied correspondingly to systems containing a plurality of combination layers or other media, for example optically biaxial media.

Electrooptical systems according to the invention containing a TN liquid-crystal layer may contain, for example, one or more, but in particular one, compensation layer based on low-molecular-weight nematic liquid-crystal layers. The indicatrix of nematic liquid-crystal molecules is a triaxial ellipsoid in which the refractive index belonging to the longitudinal molecular axis is greater than the other two refractice indices.

Compensation layer based on nematic liquid crystals have already been proposed for TN cells and in particular for STN cells; further details are given, for example, in U.S. Pat. No. 4,435,065, EP 0 139 351, K. Katoh et al., Jap. J. Appl. Phys. 26 (1987), L 1784, and SID Digest Vol. 20, 1989, papers 22.3–22.6.

The liquid-crystalline compensation layer and the liquid-crystal layer serving for information display are arranged between plane-parallel substrates provided with alignment layers. Since the compensation layer is generally not addressed, there are generally no electrode coatings present; however, variants with electrode coating are also possible. In order to increase the transmission, a central substrate which is common to the liquid-crystal layer and the liquid-crystalline compensation layer is preferably used. However, it is also possible to use two separate central substrates. The liquid crystal in the compensation layer is preferably in a twisted structure, the twist angle given by the alignment of the alignment layers and/or by the cholesteric pitch of the liquid crystal being, in particular, in the opposite direction to the twist angle $\beta$ of the liquid-crystal layer. The absolute values for the twist angles are preferably chosen to be essentially the same; however, relatively large differences are also possible. The angle between the alignments of the alignment layers of the liquid-crystal molecules on both sides of the central substrate common to the liquid-crystalline compensation layer and the liquid-crystal layer or on the lower substrate of the upper layer and the upper substrate of the lower layer is between 30° and 150°, but preferably between 50° and 130°, in particular essentially 90°.

Electrooptical systems according to the invention containing a TN liquid-crystal layer may also contain one or more, but in particular one, compensation layer based on a liquid-crystalline polymer. Compensation layers of this type are described in detail in DE 39 19 397.

Electrooptical systems according to the invention containing a TN liquid-crystal layer may furthermore preferably also contain one or more, but in particular one, compensation layer based on an optically negative medium having 3 optical refractice indices.

With reference to FIG. 22, the optical axis 9 corresponding to the lowest refractive index can in a preferred embodiment of the systems according to the invention be aligned essentially parallel to the electrode surfaces 12, the angle between the optical axis 9 corresponding to the lowest refractive index and the electrode surface being $0 \leq \tau \leq 2°$. In another preferred embodiment of the systems according to the invention, the electrooptical axis corresponding to the lowest refractive index 9 forms an angle of $2° < \tau \leq 60°$ with the electrode surface 12, in such a manner that the angle between the optical axes of the addressable liquid-crystal layer 10 and the compensation layer 9 passes through a minimum during application and increase of a voltage to the addressable liquid-crystal layer. The particularly preferred range for $\tau$ is $5° \leq \tau \leq 45°$ and the very particularly preferred range is $5° \leq \tau \leq 25°$. The plane 11 set up by the two other refractive indices of the compensation medium forms an angle of between 30° and 150°, but preferably between 50° and 130° and in particular essentially 90°, with the directors 10 of the liquid-crystal molecules of the TN layer 14 on both sides of the central substrate common to the compensation layer 15 and the TN liquid-crystal layer 14 or on the lower substrate of the upper layer and the upper substrate of the lower layer in the substrate plane.

In a particularly preferred embodiment, a uniaxial, optically negative compensation medium is used which has an axis of symmetry which, as indicated above, is aligned essentially parallel to the extraordinary axis and forms an angle of between $0°\leq\tau\leq 60°$ with the substrate plates, $\tau$ being in the range from $2°\leq\tau\leq 60°$.

Compensation layers of this type are novel and preferred and are the subject-matter of this invention. The biaxial or uniaxial, optically negative compensation layers are preferably based on low-molecular-weight discotic and/or cholesteric molecules, which may have an essentially homeotropic alignment or may be arranged in a tilted manner. For the alignment of these molecules, which have a more or less planar, two-dimensional, for example disc-like, shape, the substrate surface can be provided, for example, with lecithin, quaternary ammonium compounds, such as, for example, HTAB (U.S. Pat. No. 3,694,053), silane compounds (Appl. Phys. Lett. 22 (1973), 368), chromium complexes (Appl. Phys. Lett. 27 (1975), 268) or with alignment layers comprising other materials. An essentially homeotropic alignment 15 (FIG. 22b) means that the surface perpendicular 9 of the plane 11 set up by the two larger refractice indices is essentially parallel to the electrode surface 12 or forms a small angle of, for example, less than 2° with the latter ("upright discs"), whereas, in a tilted arrangement of the molecules 15 (FIG. 22a), this surface perpendicular 9 forms an angle of, for example, 2°–60° with the electrode surfaces 12 ("tilted discs"), with the alignment of this angle being such that the angle between the optical axes of the compensation layer 9 (corresponding to the axis 9 corresponding to the lowest refractive index or the surface perpendicular 9 just mentioned) and the addressable liquid-crystal layer 10 first drops on application and increase of a voltage at the addressable liquid-crystal layer, passes through a minimum (zero transition) and then increases again. Examples which may be mentioned are a number of discotic liquid-crystalline compounds, this list merely having the purpose of illustrating the invention, without representing a limitation:

(1) hexasubstituted benzene

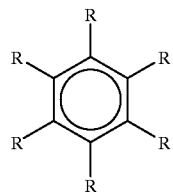

(2) 2,3,6,7,10,11-hexasubstituted triphenyls

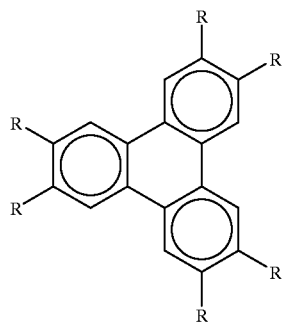

(3) 2,3,7,8,12,13-hexasubstituted truxenes or oxidised homologues thereof

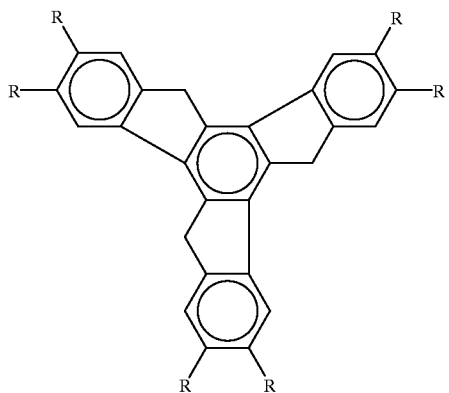

(4) 1,2,3,5,6,7-hexasubstituted anthraquinones

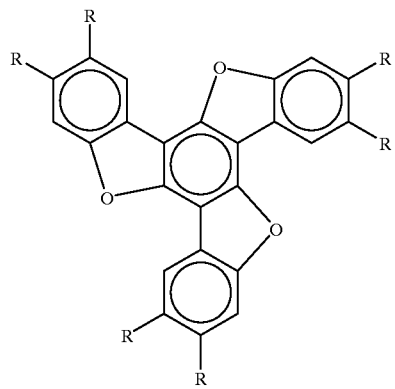

(5) substituted Cu complexes

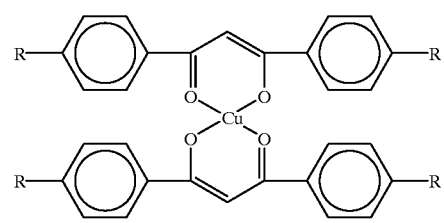

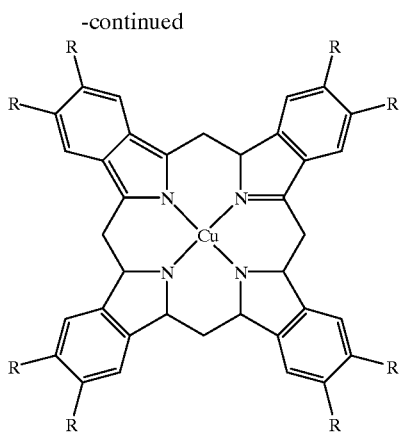

(6) tetraarylbipryanylidum

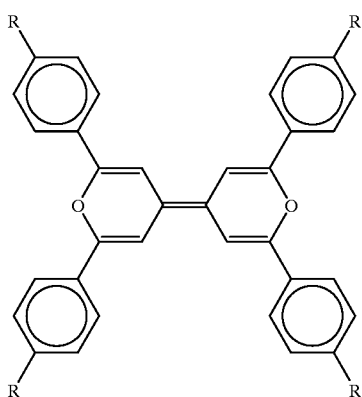

(7) porphyrin derivatives

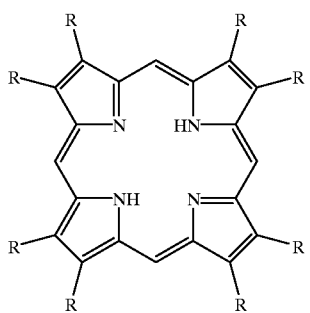

in which each R is, independently of one another, an alkyl group having up to 30 carbon atoms in which, in addition, one or more CH$_2$ groups may be replaced by —O—, —CO—, —O—CO—, —CO—O—, —C≡C—, —CH=H—, — —,— —COO, —O— —COO—, and where 2 oxygen atoms are not linked directly to one another.

Preference is given to the compounds (1), (2), (3) and (4), in particular to the compounds (1), (2) and (3). Particular preference is also given to discotic liquid-crystal compounds in which at least one —CH$_2$— group in all the radicals R has been replaced by a 1,4-phenylene group.

Discotic liquid crystals which have a nematic discotic phase N$_D$ are preferred. In contrast to the columnar discotic phase, in which the molecules are packed together to form columns, the arrangement of the molecules in the nematic discotic phase is less rigid. The molecules are able to rotate freely and can align more or less freely, but their planes are arranged on average parallel to one another. It is also possible to use cholesteric nematic discotic phases N$_D$*.

Figure 17:
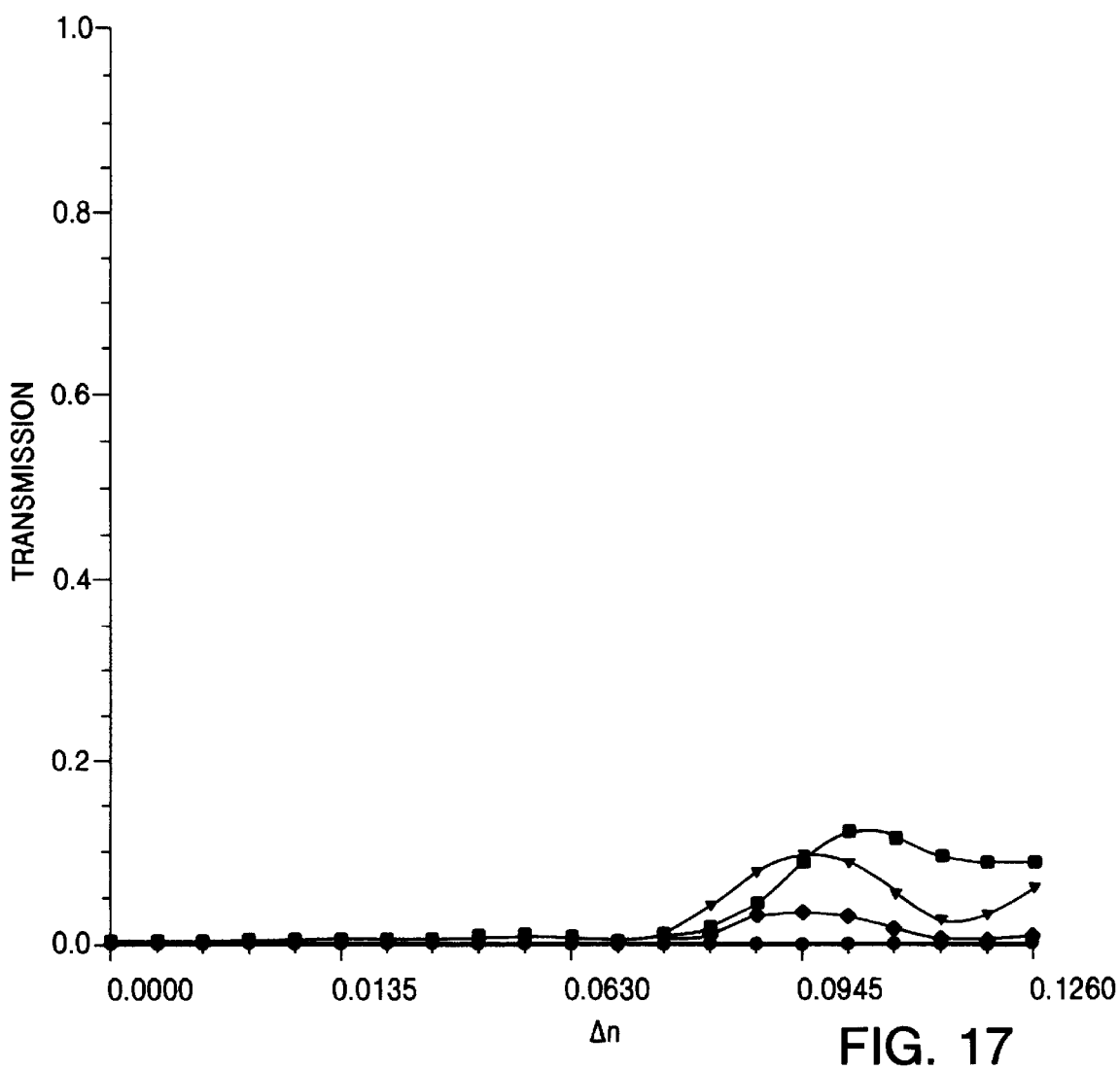
Figure 18:
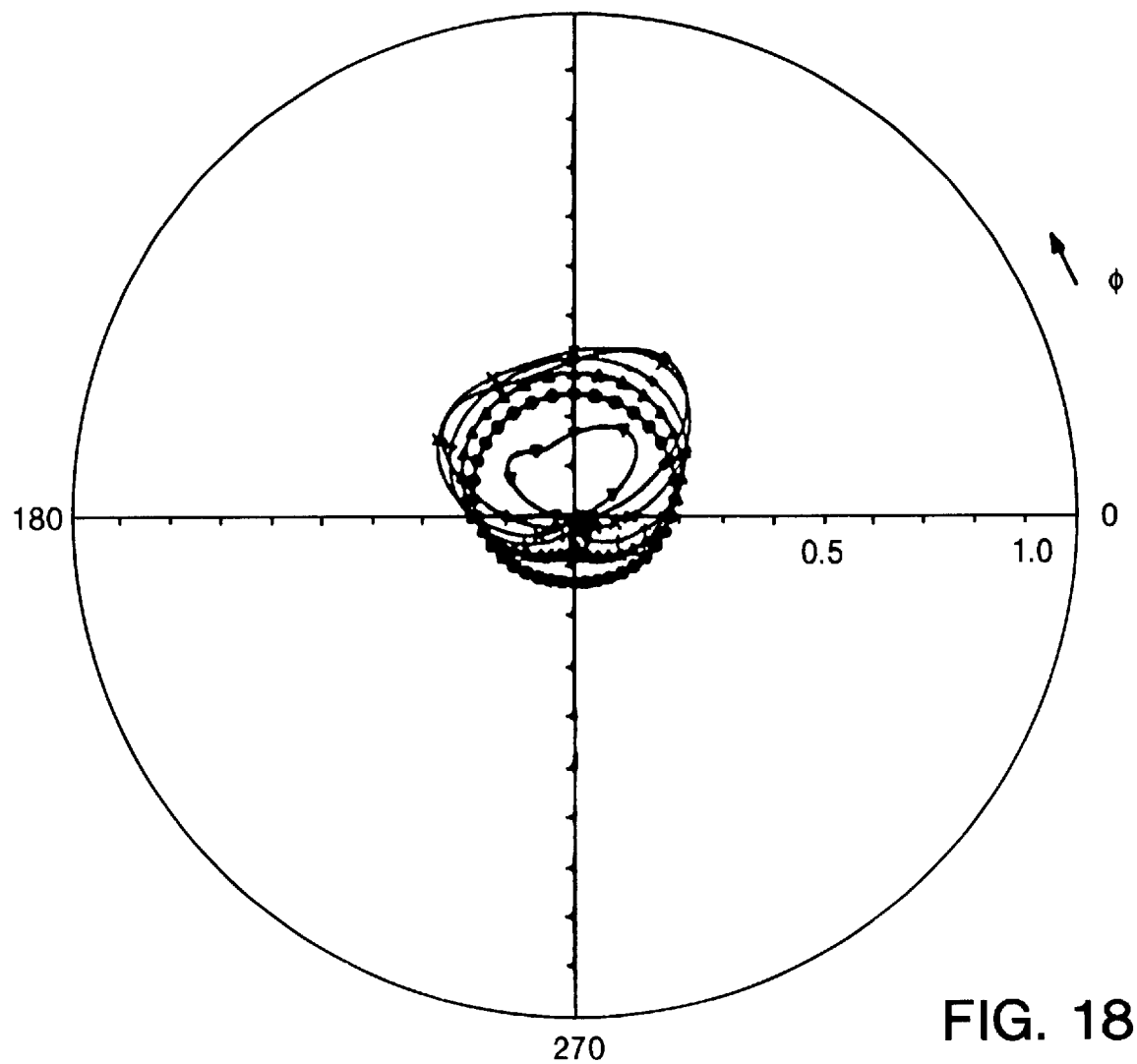

An optically negative compensation layer can also be approximated by a series of optically positive layers whose alignment varies from layer to layer. As an example, FIG. 17 shows a diagrammatic representation of an arrangement according to the invention in which the addressable liquid-crystal layer, which is based on a nematic liquid crystal having a homogeneous alignment ($\alpha=1°$) and a twist angle $\beta=0°$, is combined with a series of 8 optically positive compensation layers. These compensation layers comprise alternately parallel (=homogeneous or planar) aligned ($\alpha=1°$) nematic liquid-crystal layers ($\beta=0°$) and homeotropically aligned liquid-crystal layers ($\beta=0°$), with the directors of the liquid-crystal molecules at the lower substrate of the addressable layer (or at the corresponding common substrate) forming an angle of approximately 90° with the directors of the liquid-crystal molecules at the upper substrate (or at the corresponding common substrate) of the adjacent compensation layer 1 of II (see FIG. 17). The thickness of the addressable liquid-crystal layer in FIG. 17 is d=8 μm. The overall thickness of the compensation layer and the nematic liquid crystals used in the addressed layer and in the compensation layer are selected so that the optical thickness of the compensation layer at 2 d·Δn is twice that of the addressed liquid-crystal layer at d·Δn. If, for example, the same liquid crystal is used in the addressed liquid-crystal layer and in the compensation layer, the overall thickness of the compensation layer is selected to be 2d=16 μm; however, any other combinations of the layer thickness and the birefringence of the compensation layer are also possible. The use of the same liquid crystal has the advantage that the addressed liquid-crystal layer and the compensation layer have the same dispersion and the same temperature dependence of birefringence and dispersion. The arrangement in FIG. 17 is located between two polarisers, with the angle ψ formed by the front polariser with the alignment direction of the directors of the nematic liquid-crystal molecules on the uppermost substrate plate, being 45°. The rear polariser is rotated by 90° relative to the front polariser. FIG. 18 shows the transmission for this system according to the invention as a function of the birefringence Δn of the addressed liquid-crystal layer at an angle (azimuth angle) φ=135° measured in the plane when the system is not addressed. It can be seen that, up to an observation angle θ of about 30°, the system exhibits an ideal barrier behaviour in the Δn range shown, while transmission is found at relatively high Δn values of more than about 0.0735 for observation angles θ of greater than 45°. It has also been found that the transmission in the visible spectral region in the unaddressed state is virtually independent of the light wavelength.

This transmission behaviour corresponds to that of a system according to the invention having an optically negative compensation layer comprising, for example, discotic molecules which are oriented in such a manner that the axis corresponding to the lowest refractive index is essentially parallel to the electrode surfaces or forms an angle τ as defined above with the latter.

The compensation layer shown in FIG. 17 comprises 8 cells having a thickness of 2 μm and filled with the same liquid crystal as the addressable liquid-crystal layer. However, an arrangement of this type is generally not preferred due to the large number of substrates and alignment layers required in practice, with the disadvantage on the one hand of the high cost of producing the system and on the other hand the significantly reduced overall transmission due to the large number of glass substrates and alignment layers.

However, the object of FIG. 17 is merely to illustrate the principle of a compensation layer of this type, and a wide range of variants are possible. Thus, for example, the layers of monomeric nematic liquid crystals can be replaced or combined with stacks of films comprising liquid-crystalline polymers whose mesogenic groups are aligned correspondingly, and/or with films comprising isotropic polymer material which are axially stretched correspondingly. Liquid-crystalline polymeric compensation films and compensation layers obtained by stretching thermoplastic polymers are described briefly below.

In approximating an optically negative compensation layer, it is important that the compensation layer comprises a series of optically positive layers with the optical axes of two successive layers forming an angle of between 60° and 120°, in particular between 80° and 100°, in particular being essentially perpendicular to one another. The compensation layer preferably comprises at least 2 layers, in particular not less than 4 layers; very particularly preferred compensation layers comprise at least 8 successive layers. The compensation layers preferably have an even number of successive layers.

The liquid-crystal molecules present in the individual layers of the compensation layer or the mesogenic groups in the liquid-crystalline polymers may be twisted or not, the twisting preferably being selected in accordance with that of the addressable liquid-crystal layer.

The optical thickness of the compensation layer is preferably at least 1.5 times, in particular at least 1.8 times, the optical thickness of the addressable liquid-crystal layer.

The alignment of the first layer of the compensation layer, which follows the addressable liquid-crystal layer, is not particularly crucial. Thus, instead of the configuration shown in FIG. 17, it is also possible, for example, to use a compensation layer whose first layer is homeotropically or essentially homeotropically aligned. The angle formed by the liquid-crystal molecules of the addressable liquid-crystal layer and the adjacent layer of the compensation layer in arrangements analogous to FIG. 17 in the substrate plane is preferably between 30° and 150°, in particular between 50° and 130°, very particularly essentially 90° (FIG. 17); in other arrangements, the person skilled in the art can easily indicate suitable alignments of the parallel-aligned nematic molecules in the addressable liquid-crystal layer and in the compensation layer.

It has been found that optically negative compensation layers can be excellently approximated by a stack of this type of successive, optically positive layers with optical axes of various alignments. The properties of an optically negative compensation layer are virtually achieved in a sequence of at least 8 optically positive layers, and, compares with an optically negative compensation layer, it is sometimes even possible to effect an improvement if more layers are used. Compensation layers of this type which comprise a stack of optically positive layers and are overall optically negative are novel and are the subject-matter of this invention.

Further particularly preferred optically negative compensation layers are liquid-crystalline side-chain polymers which contain, as mesogenic radicals, chloesteric and/or discotic groups (cf. for example, also German Patent 34 30 482), which may be derived, for example, from the discotic compounds just described, but also from other cholesteric or discotic compounds. Also preferred are liquid-crystalline side-chain polymers containing plate-like mesogenic groups. An essentially homeotropic alignment of the mesogenic groups is usually achieved by subjecting the polymer, at above the glass transition temperature, to an electrical and/or magnetic field and/or to mechanical stress. The alignment induced in this way can be frozen by cooling the polymer to below the glass transition temperature with the field switched on or while maintaining the mechanical stress. Liquid-crystalline polymers of this type and processes for their alignment are described in detail in DE 39 19 397.

Figure 1B:
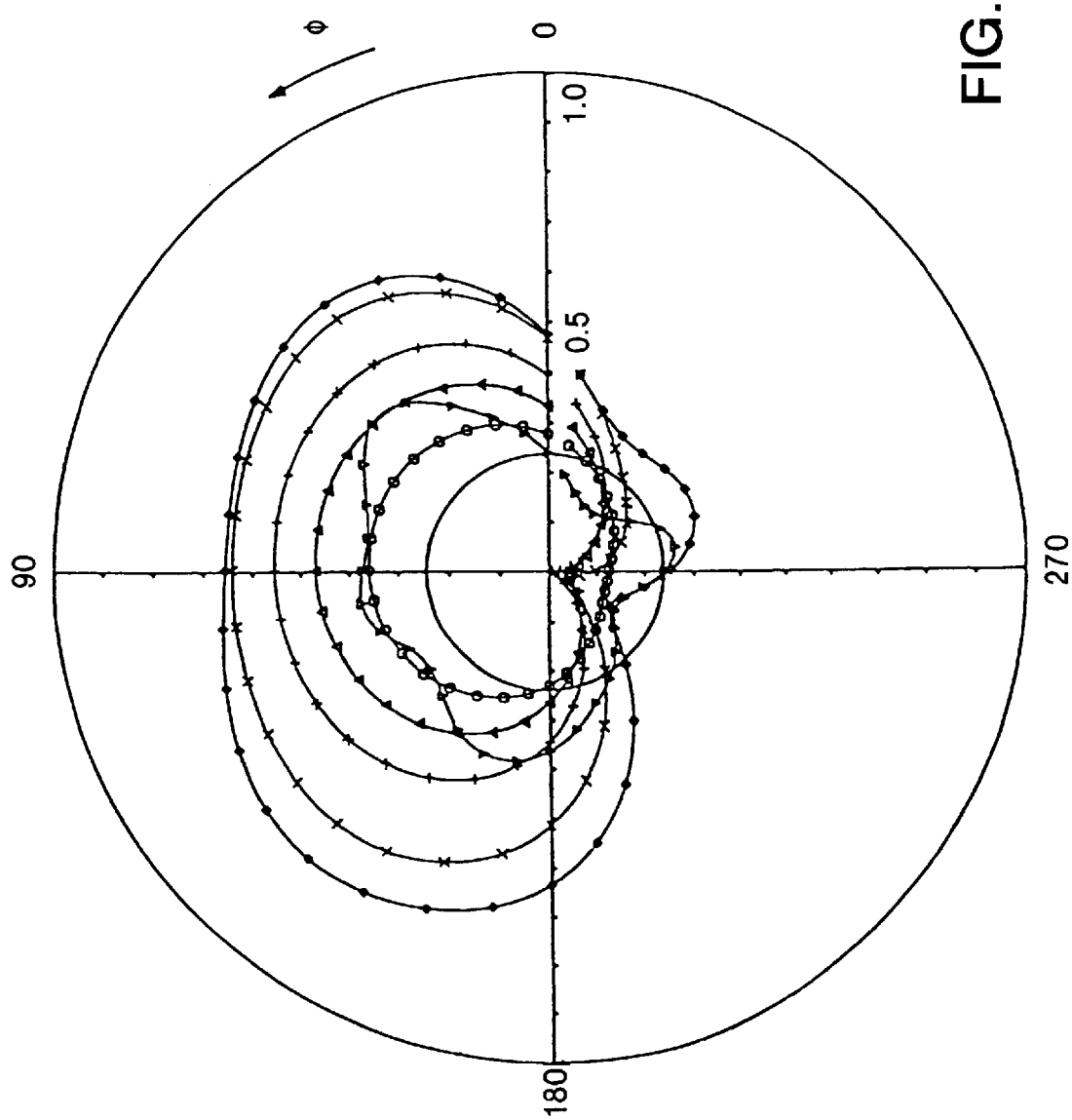

FIGS. 1a and 1b show the transmission I for two electrooptical systems according to the invention as a function of the angle ø, measured in the display plane, with the observation angle θ, measured from the perpendicular of the display plane, as parameter is compared. In this case, the compensation layer of the system from FIG. 1a is based on a nematic liquid-crystal layer, while an optically negative compensation layer having a homeotropic alignment is used for the system from FIG. 1b, the lowest refractive index $n_{min}$ being 1.5000, and the two other refractive indices being equal and having a value of 1.5356. In both arrangements, the liquid-crystal layer has a twist angle β of 22.5 and a layer thickness of 8 µm, and the pretilt angle is 1°. A linear polariser is used on both the input side and the output side of the arrangement, with ψ being 56.25°; the rear polariser is rotated by 90° with respect to the front polariser. The voltage applied to the TN liquid-crystal layer is selected for both arrangements at U=1.15 V so that a transmission of 0.23 is observed for all viewing angles in the case of perpendicular observation (θ=0°). FIGS. 1a and 1b show for both systems the transmissions determined at observation angles of θ=10°, 20°, 30°, 45°, 60° and 80° as a function of ø. Differences are observed in the transmission determined for θ=0°, which is represented in this diagram by a circle having a radius of 0.23 around the origin, the extent of these deviations being a measure of the viewing angle dependence of the contrast.

Comparing FIGS. 1a and 1b, it can be seen that the system containing the novel compensation layer according to the invention has good viewing angle dependence of the contrast. Although the transmission profiles are deformed somewhat more elliptically than in FIG. 1a, the extent is, on the other hand, frequently less than in FIG. 1a In the arrangement described in FIG. 1b, the axis corresponding to the lowest refractive index is aligned essentially parallel to the electrode surface. In this compensation method, an optimum barrier behaviour in the unaddressed state is obtained in addition to the good viewing angle dependence of the transmission shown in FIG. 1b.

Surprisingly, it has been found that the viewing angle dependence of the contrast can be improved if the optically negative compensation layer has a tilted alignment, i.e. if the axis corresponding to the lowest refractive index forms an angle τ with the electrode surface. The angle X is preferably between 2 and 60°, in particular between 5 and 45°, very particularly between 5° and 25°, and is preferably aligned in such a manner that the angle between the nematic director of the liquid-crystal molecules of the addressable liquid-crystal layer, i.e. the optical axis of the addressable liquid-crystal layer, and the axis corresponding to the lowest refractive index initially reduces with increasing voltage, then passes through a minimum (zero transition) and increases again.

Figure 19:
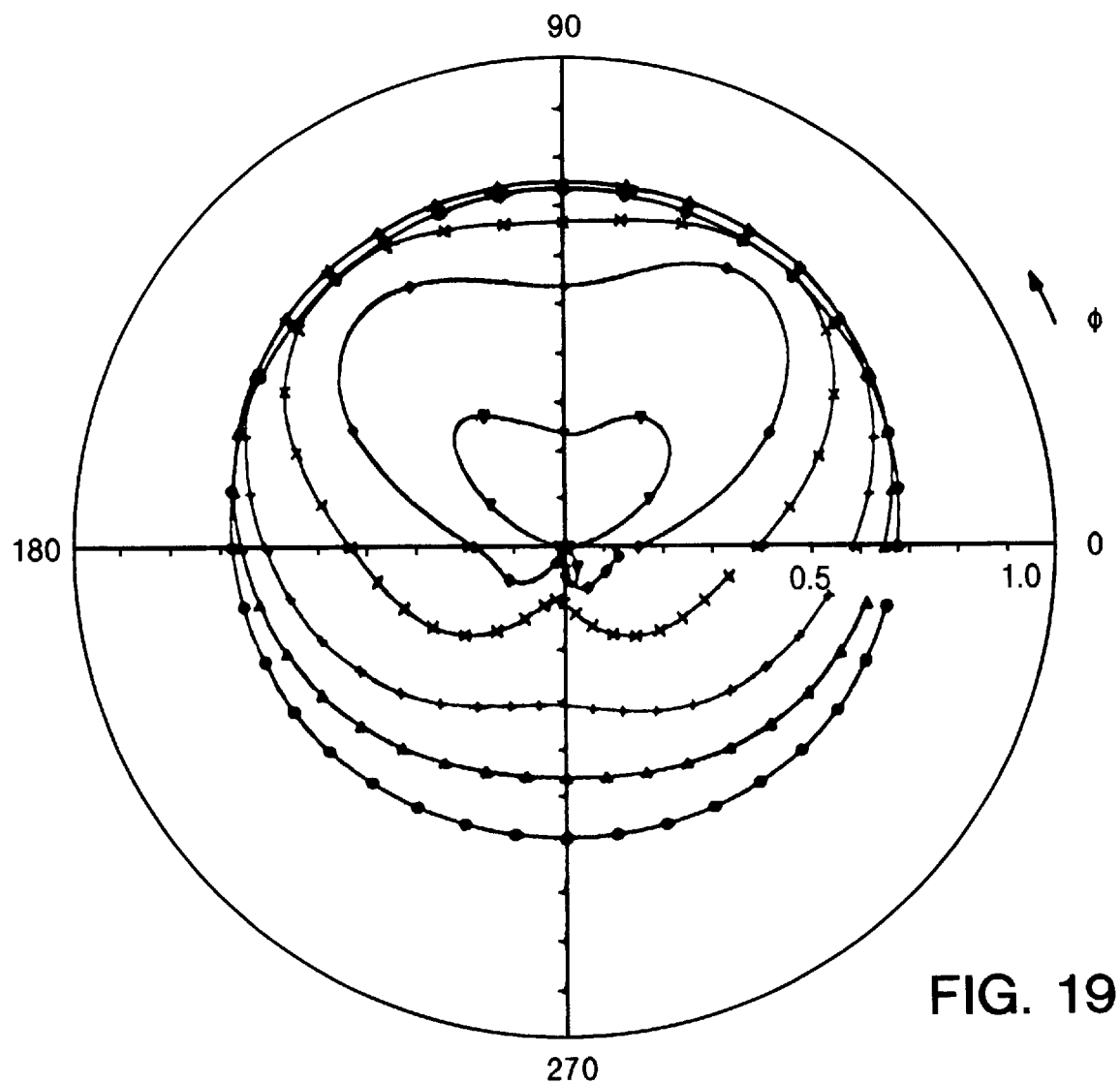

In such an arrangement of the compensation layer, an optimum barrier behaviour is not observed in the voltage-free state, but instead on increasing the voltage below the threshold voltage if the angle between the optical axes of the addressable liquid-crystal layer and the compensation layer is minimal (zero transition). However, this hardly impairs the electrooptical properties of such systems. FIG. 19 shows the transmission I for a system according to the invention having a tilted, optically negative compensation layer for a wavelength λ=550 nm and at a voltage corresponding to 1.1 times the threshold voltage (U/T$_o$)=1.1) as a function of the viewing angle, measured in the display plane, with the observation angle measured from the perpendicular of the display plane as parameter. The addressable liquid-crystal layer of this system has a twist angle β of 0° and a pretilt α of 1° and the layer thickness is 8 µm. The compensation layer, whose lowest refractive index is 1.500, whereas the other two refractive indices are 1.5557, comprises 8 optically positive layers with a thickness of 1 µm each, having alternately homogeneous (α=1°) and homeotropic (α=89°) alignments. The optical axis corresponding to the lowest refractive index forms an angle of about 15° with the electrode surface, so that the angle between the preferential direction of the nematic directors and the axis corresponding to the lowest refractive index initially drops with increasing voltage, then passes through a minimum (zero transmission) and increases again.

Figure 20:
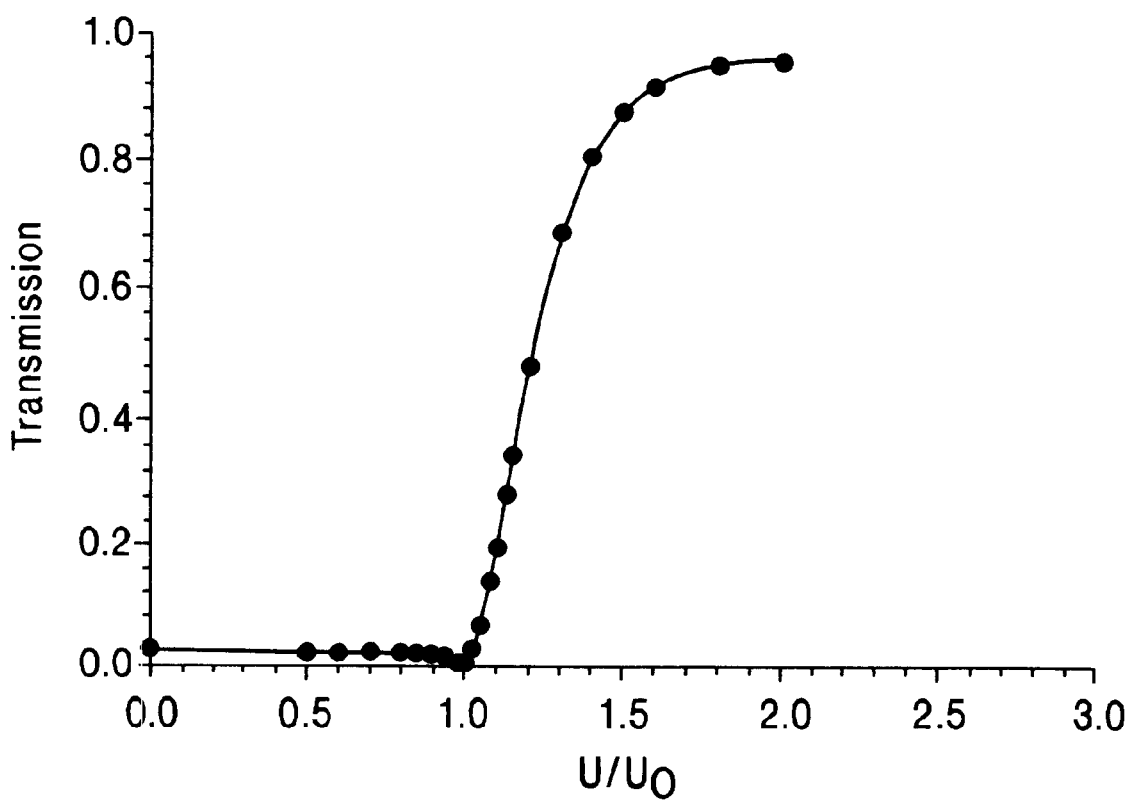
Figure 21A:
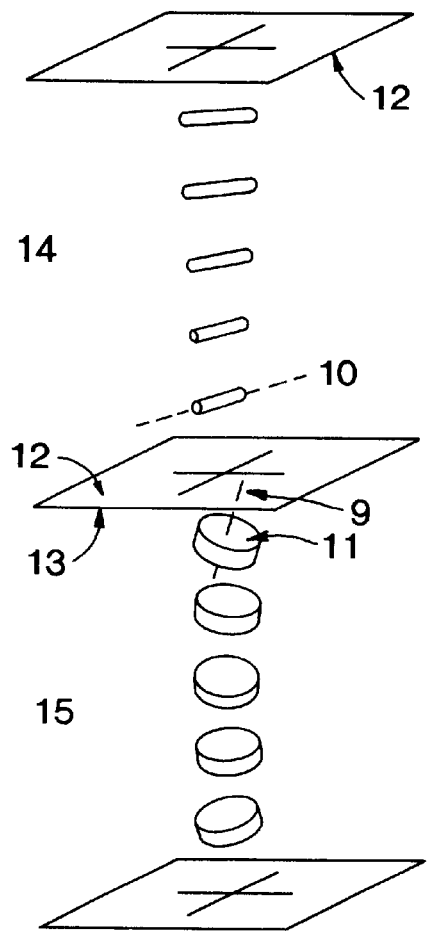
Figure 21B:
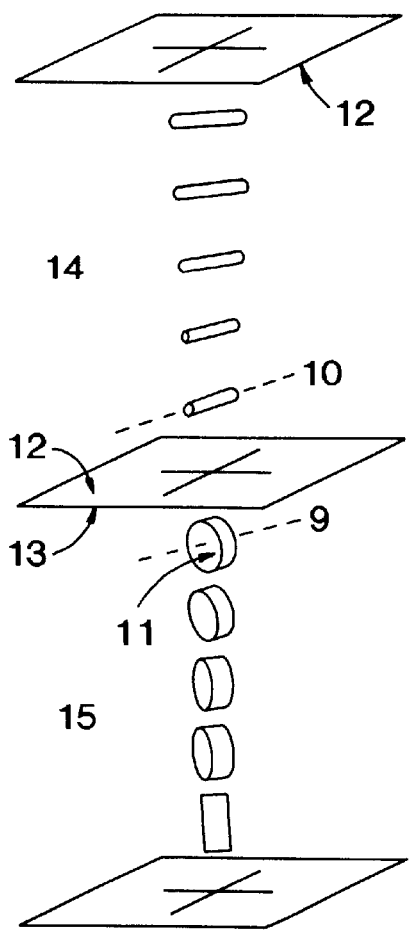

It can be seen in FIG. 19 and FIG. 20, which shows a diagram corresponding to FIG. 19 for U/U$_o$=1.3, that the transmission for observation angles up to about 30° only differs slightly from the transmission at θ=0°, which is reproduced in this diagram as a circle of radius of about 0.68 around the origin. A comparison with FIG. 1b shows that the viewing angle dependence of the contrast is significantly improved by the tilted alignment of the optically negative compensation layer. FIG. 21 shows the electrooptical characteristic line for the system described in FIG. 19; it can be seen that the electrooptical characteristic line is virtually unimpaired by the fact that the optimum barrier state does not coincide with the voltage-free state.

Electrooptical systems which contain an addressable nematic liquid-crystal layer where 0°≦β≦90° and in particular 0≦β≦90° and an optically negative, tilted compensation layer are novel. Preferred systems are those in which the polariser alignments are additionally given by equation (1) or (2) and by (3) or (4).

These systems are characterised by excellent properties and they are the subject-matter of the present invention. The specific system described in FIG. 19 is intended merely to illustrate this invention, but does not represent a limitation. Corresponding results were also obtained for systems containing a twisted nematic addressable liquid-crystal layer. The compensation layer can be based on disc-shaped molecules, such as, for example, discotics, or on other biaxial or uniaxial, optically negative compensation layers. It is also possible in particular, for the compensation layer to be approximated by one of the above-described stacks of optically positive layers with different alignments.

Furthermore, electrooptical systems according to the invention containing a TN liquid-crystal layer may also contain one or more, but in particular one, compensation layer based on a thermoplastic polymer material, for example based on polycarbonate, polyvinyl alcohol or polyethylene terephthalate, and aligned axially with the desired alignment; films of this type are indicated, for example, in EP0 315 484.

If the twist angle of the TN liquid-crystal layer is small and in particular β≦60°, the compensation layer can also be omitted in the electrooptical systems according to the invention. Particularly favourable electrooptical properties are exhibited by electrooptical systems without a compensation layer if the twist angle of the TN liquid-crystal layer β is ≦45°, in particular 15°≦β≦30° and very particularly β≦22.5°. Systems of this type, which are known as uncompensated LTN (low twisted nematic) systems are novel, preferred and a subject-matter of the present invention.

Electrooptical systems according to the invention containing an ECB liquid-crystal layer contain one or more compensation layers, but in particular one compensation layer, based on thermoplastic polymers, low-molecular-weight liquid crystals and/or liquid-crystalline polymers. Compensation layers of this type are described in detail in the literature (for example DE 39 11 620, DE 39 19 397, EP 0 240 379 and EP 0 239 433).

The electrooptical systems according to the invention furthermore contain at least one device for linear polarisation of the light in such an arrangement that the light, before entering and after exiting the liquid-crystal layer, passes through a linear polariser at least once. A linear polariser is frequently arranged on each side of the display; these polarisers usually comprise films bonded to the substrate plates. An arrangement of this type can be operated transmissively or alternatively reflectively or transflectively; in reflective or transflective systems, a reflector or a reflector and an additional illumination device is arranged behind the polariser furthest from the light source (see, for example, E. Kaneko, Liquid Crystal TV Displays, KTK Scientific Publishers, Tokyo, 1987, p. 25 and p. 30). In other, preferred embodiments of the electrooptical systems according to the invention, by contrast, only one device is used for linear polarisation of the light. An example is the reflective device shown in FIG. 2, in which the light entering or exiting the cell sees the McNeil prism used as polariser as a combination of 2 polarisers rotated by 90° with respect to one another. A reflective arrangement of this type is particularly interesting, for example, for projection displays.

The above-described structure of the electrooptical systems according to the invention is based essentially on the usual design for systems of his type. The term usual design is broadly drawn here and includes all derivatives and modifications not explicitly mentioned here. Where novel and inventive elements or essential design differences are mentioned in the above-described structure of the electrooptical systems according to the invention, these are explicitly characterised as belonging to the subject-matter of the invention.

A very essential difference of the electrooptical systems according to the invention is, however, that, in order to achieve high contrast and/or high brightness and/or high viewing angle independence of the contrast and/or of the colour values, the angle ψ which the polarisation device forms on the side facing the light source with the preferential direction of the liquid-crystal molecules on the substrate surface is optimised.

ψ satisfies condition (1) or (2)

$$\psi=(\beta+90°)/2\pm10° \tag{1}$$

$$\psi=\beta/2\pm10° \tag{2}$$

if a polarisation device is located on both the input and output sides, the polariser on the output side being rotated by 90±10° with respect to the polariser on the input side, and it also being possible for the alignments of the polarisers on the input side and the output side to be interchanged, or satisfies condition (3) or (4)

$$30°\leq\psi\leq70° \text{ for } 0\leq\beta\leq45° \tag{3}$$

$$35°\leq\psi\leq90° \text{ for } 45°\leq\beta\leq100° \tag{4}$$

if only one polarisation device is present on the input side.

Figure 3:
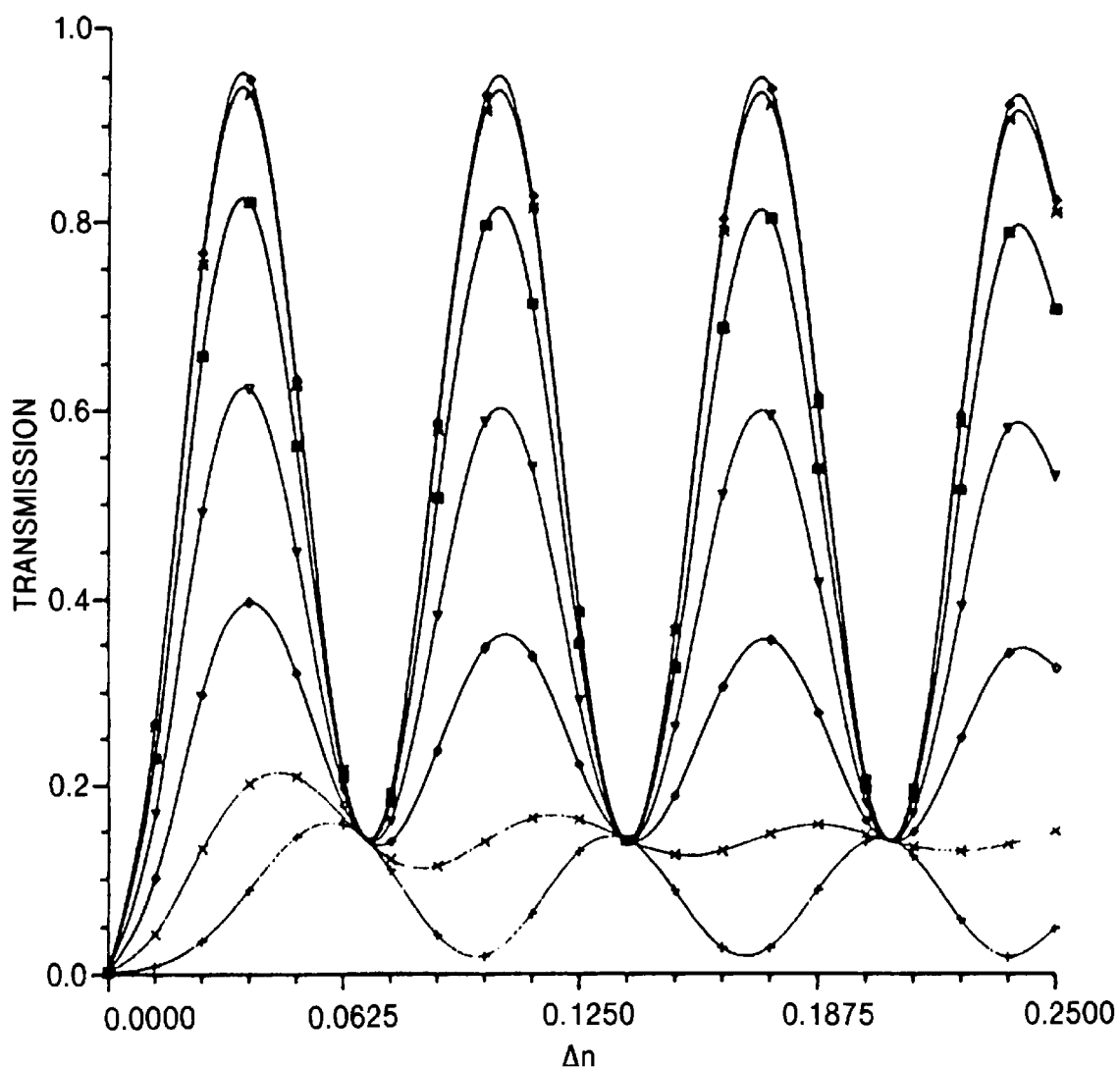

FIG. 3 shows, for an uncompensated electrooptical system containing a TN liquid-crystal layer which has a twist angle β of 22.5° and a layer thickness of 8 μm, the transmission or brightness in the unaddressed state for a wavelength λ of 550 nm and for θ=0° and ø=0° as a function of the birefringence Δn of the nemative liquid-crystal layer with ψ as parameter. The cell is an uncompensated TN cell since the transmission for a TN cell containing a compensation layer with crossed polarisers in the unaddressed state is very low, irrespective of the optical anisotropy Δn, and the transmission of a compensated system depends essentially on the transmission of the unaddressed compensation layer.

The system contains two polarisation devices, the rear polariser being rotated by 90° with respect to the front polariser. The transmission or brightness is highly dependent on the polariser setting and is at an optimum for $$\psi_{opt.}=(\beta+90°)/2=(22.5°+90°)/2=56.25°.$$

A slight deviation of the angle v actually set from the optimum value can be tolerated. Thus, for example for ψ=52.5°, a transmission reduced by about 2% with respect to the optimum value $\psi_{opt.}$ is observed. By contrast, a transmisison of more than 13% lower than the optimum is found for ψ=45°. The deviation of the angle ψ actually set from the optimum value given by the above equation should generally not exceed ±10° and preferably 10% and should in particular be <7.5% and very particularly <5%.

If only one polarisation device is present, the optimum polarisation configuration is given by conditions (3) and (4). The electrooptical systems preferably contain liquid crystals having a birefringence of 0.035≦Δn≦0.010, and the layer thickness of the liquid-crystal layer and of the compensation layer is preferably 3 μm≦d≦7 μm. Very particular preference is given to electrooptical systems according to the invention having the following parameter combinations:

| Parameter combination | β | d/μm | Δn | ψ |
|---|---|---|---|---|
| 1 | 15 ≦ β ≦ 30 | 3.5 ≦ d ≦ 5 | 0.035 ≦ Δn ≦ 0.065 | 40 ≦ ψ ≦ 65 |
| 2 | 40 ≦ β ≦ 45 | 3.5 ≦ d ≦ 5 | 0.035 ≦ Δn ≦ 0.065 | 45 ≦ ψ ≦ 65 |
| 3 | 80 ≦ β < 90 | 3.5 ≦ d ≦ 5 | 0.035 ≦ Δn ≦ 0.065 | 55 ≦ ψ ≦ 90 |

The liquid-crystal layer and the compensation layer preferably have essentially the same values for the birefringence and layer thickenss. Very particularly preferred electrooptical systems are those where d=4 μm, 0.045 5≦Δn≦0.055 and β=22.520 , 45°ψ≦60° or β=45°, 50≦ψ≦60° or β=80°, 60°≦ψ≦85°.

Systems according to the invention containing 2 polarisation devices, for which ψ is given by equations (1) and (2), are described in detail below.

Figure 4A:
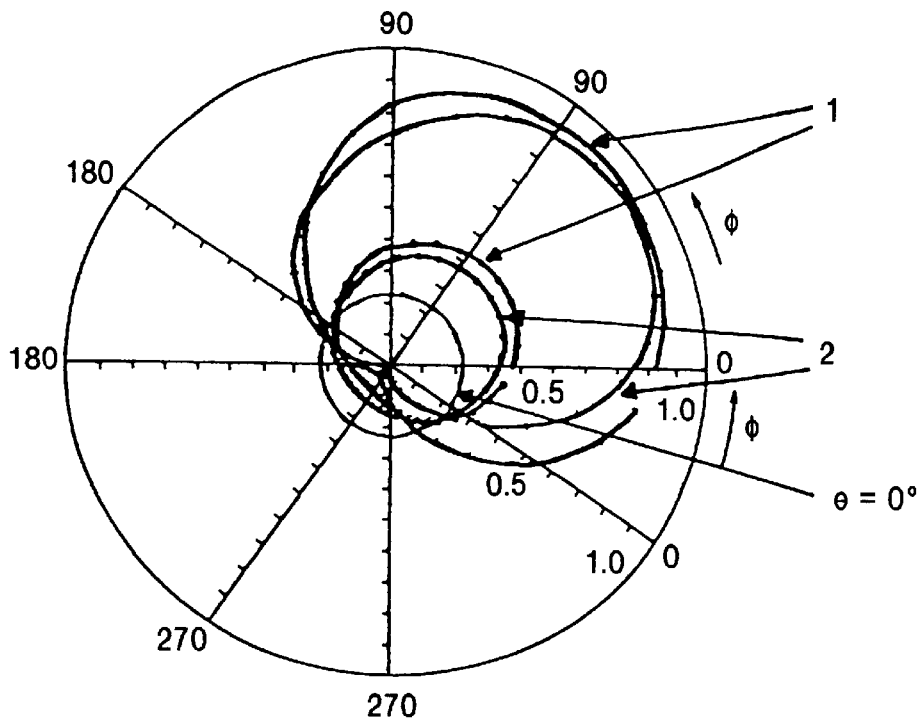

FIG. 4a shows a comparison of the transmissions I for a wavelength λ of 550 nm as a function of the viewing angle ø measured in the display plane with the observation angle θ measured from the perpendicular of the display plane as parameter for a conventional TN display and for an electrooptical system in accordance with the present invention containing an optically positive compensation layer. The conventional TN system has a twist angle of 90° and is operated at the 1st transmission minimum, the layer thickness of the TN liquid-crystal layer is 8 μm and the pretilt angle is 1°.

Figure 5:
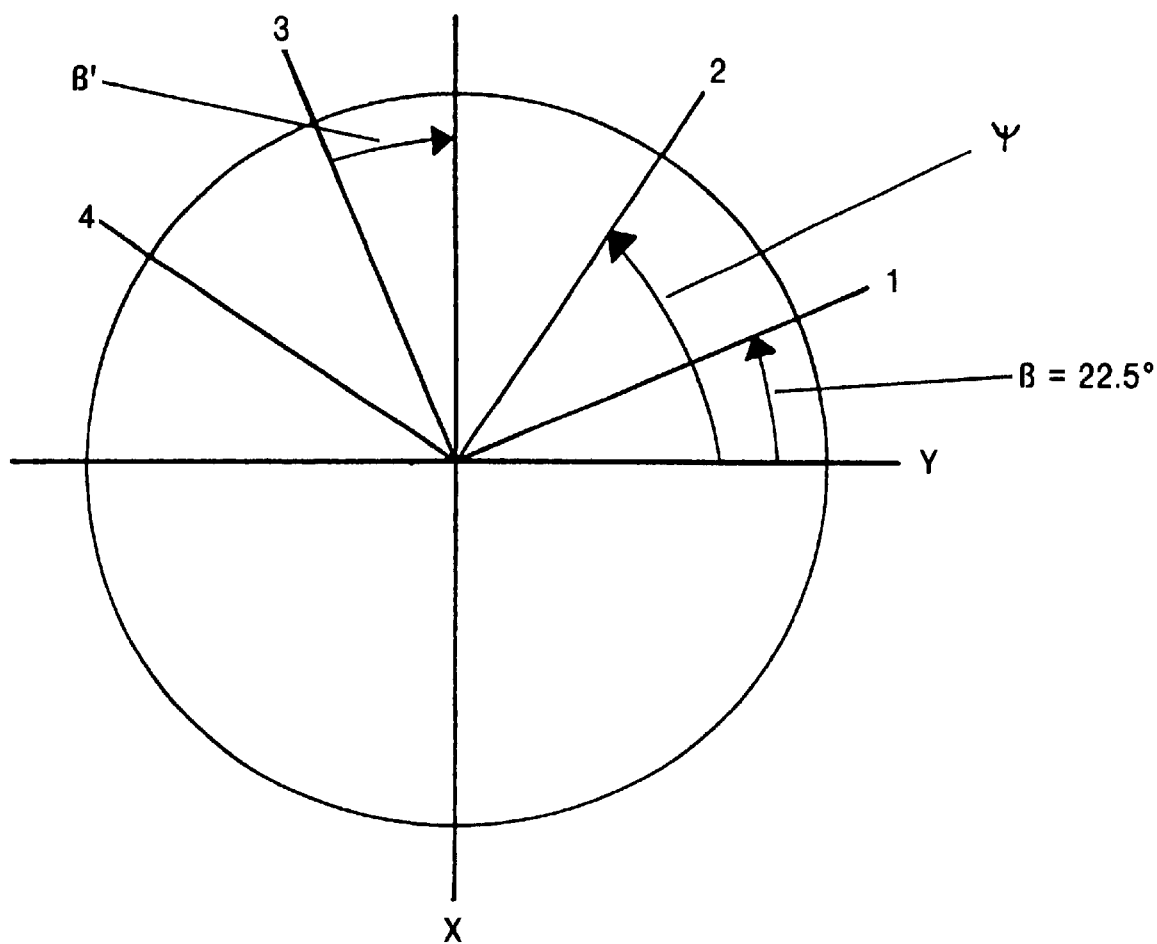

2 parallel polarisation films are used, so that the display is transparent in the unaddressed state. The configuration of the electrooptical system in accordance with the present invention is shown in FIG. 5. The twist angle of the TN liquid-crystal layer used for information display is β=22.5°. The compensation layer used is a further TN layer having a twist angle of β'=−22.5°. The angle ψ which the front polariser forms with the alignment direction of the directors of the liquid-crystal molecules on the uppermost substrate plate (=Y axis) is 56.25°. The rear polariser is rotated by 90° with respect to the front polariser. The thickness of the TN layer used for information display is 8 μm and the pretilt angle is 1°.

The voltages applied to the conventional TN cell and to the system according to the invention are selected, at $U/U_o$=1.15 and $U/U_o$=1.15 respectively, so that a transmission of 0.23 is observed for perpendicular observation (θ=0°) for all viewing angles ø. FIG. 4a shows the transmissions determined in both cells at observation angles θ of 10° and 45° as a function of ø. Deviations from the transmission determined for θ of 0°, which is shown in this diagram by a circle of radius 0.23 around the origin, are observed. Since the extent of these deviations is a measure of the viewing angle dependence of the contrast, it can be seen from FIG. 4a that the electrooptical systems according to the invention have an improved angle dependence of the contrast compared with conventional TN cells.

Figure 4B:
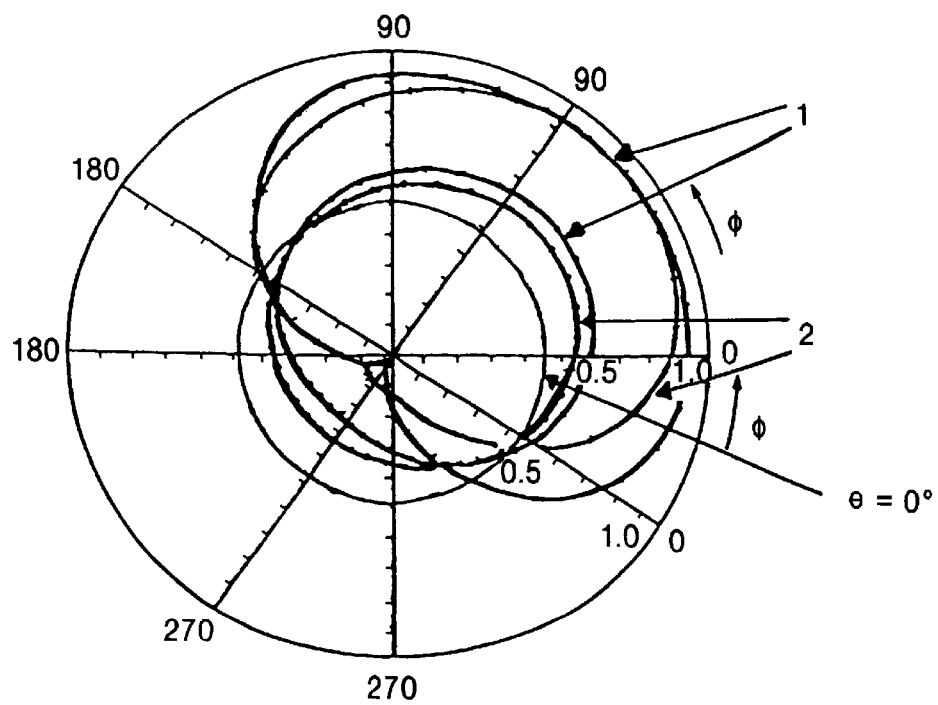

FIG. 4b shows the dependence of the transmission on the viewing angle o for the cells described in FIG. 4a, for 2 different observation angles θ of 10° and 45° as parameter, the voltages applied to the conventional TN cell and to the electrooptical system according to the invention being selected, at $U/U_o$=1.8 and 1.3 respectively, so that a transmisson of 0.45 results for perpendicular observation (θ of 0°) for all viewing angles ø. It is again apparent here that the electrooptical systems according to the invention have a lower viewing angle dependence of the contrast than conventional TN cells.

Figure 6:
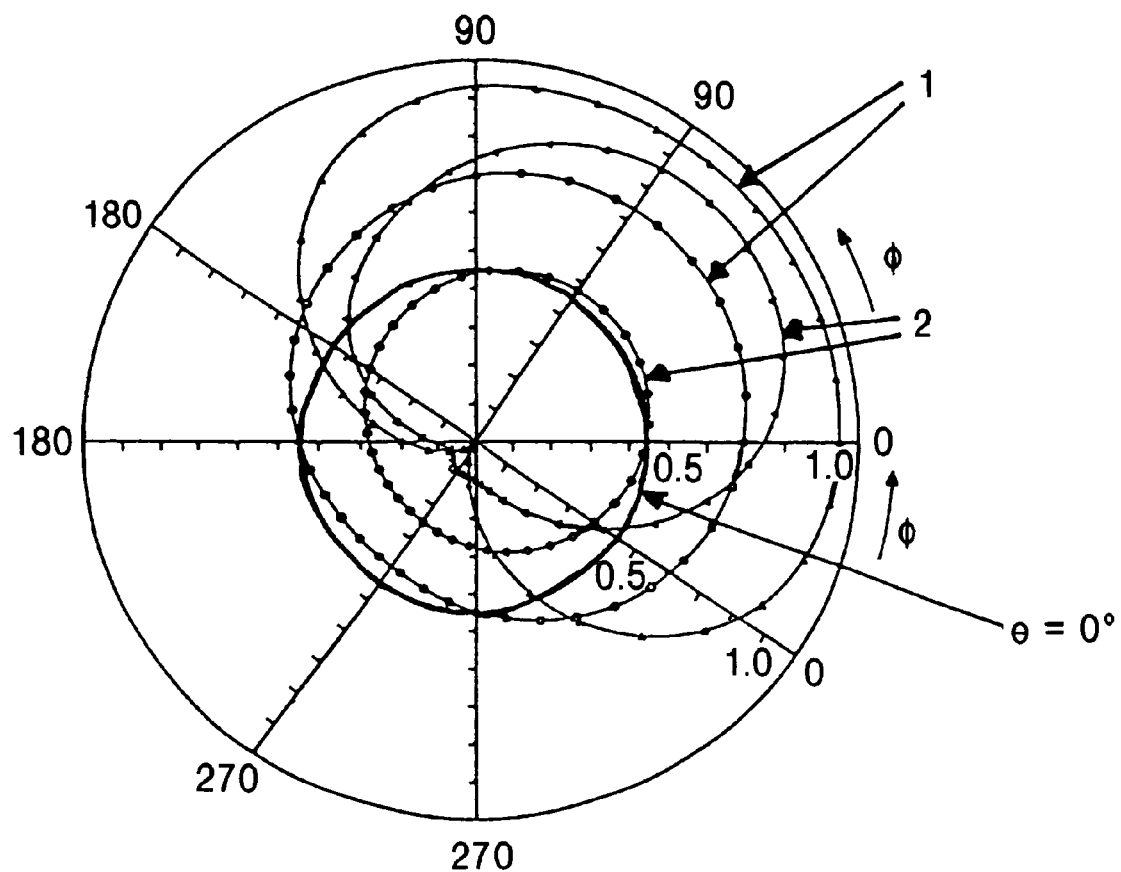

FIG. 6 shows the transmission as a function of the viewing angle ø with θ as parameter for the cells described in FIG. 4a for wavelength λ=650 nm, the voltages applied to the two cells being selected, at $U/U_o$=1.18 and 1.3 respectively, so that a transmission of 0.45 results for perpendicular observation (θ of 10°) for all viewing angles ø for light of λ=550 nm. A comparison of the transmission lines obtained for the two cells shows that the arrangement according to the invention has a significantly lower viewing angle dependence of the contrast for λ=650 nm. For λ=450 nm, a worse transmission line is observed for θ of 10° and a better one for θ=45°. Overall, the electrooptical systems according to the invention are thus also characterised by better viewing angle dependence of the colour values.

The dependence of the transmission I and/or viewing angle dependence of the contrast on the wavelength of the light can also be reduced or even substantially compensated by illuminating the system using a lamp having a suitable spectral distribution. The spectral distribution of the light emitted by the lamp can be modified, for example, by a suitable choice of the phosphors and matched to the wavelength dependence of the transmission, the intensity of the lamp light being weakened, for example in wavelength ranges in which the system has high transmission, and vice versa. Electrooptical systems according to the invention for which the lamp has such a spectral distribution that the dependence of the transmission and/or the viewing angle dependence of the contrast is as low as possible are preferred and are a subject-matter of this invention.

FIGS. 8a and 8b show the viewing angle dependence of the transmission at a wavelength $\lambda=550$ nm for 2 different cells which essentially correspond to the cells described in FIG. 4a; however, the conventional cell is additionally provided with a compensation layer where $\beta=-90$ g based on a nematic liquid crystal.

In FIG. 8a, the voltages applied to the conventional cell and to the cell according to the invention are selected, at $U/U_o=1.1$ and 1.15 respectively, so that a transmission of 0.23 results for $\theta=0°$ for all $\emptyset$; in FIG. 8b, the voltages are selected at $U/U_o=1.2$ and 1.3, which gives a transmission of 0.45 for $\theta=0°$. A comparison of the transmission lines in FIGS. 8a and 8b shows that the systems according to the invention also have significantly better viewing angle dependence of the contrast compared with compensated conventional systems.

Figure 9:
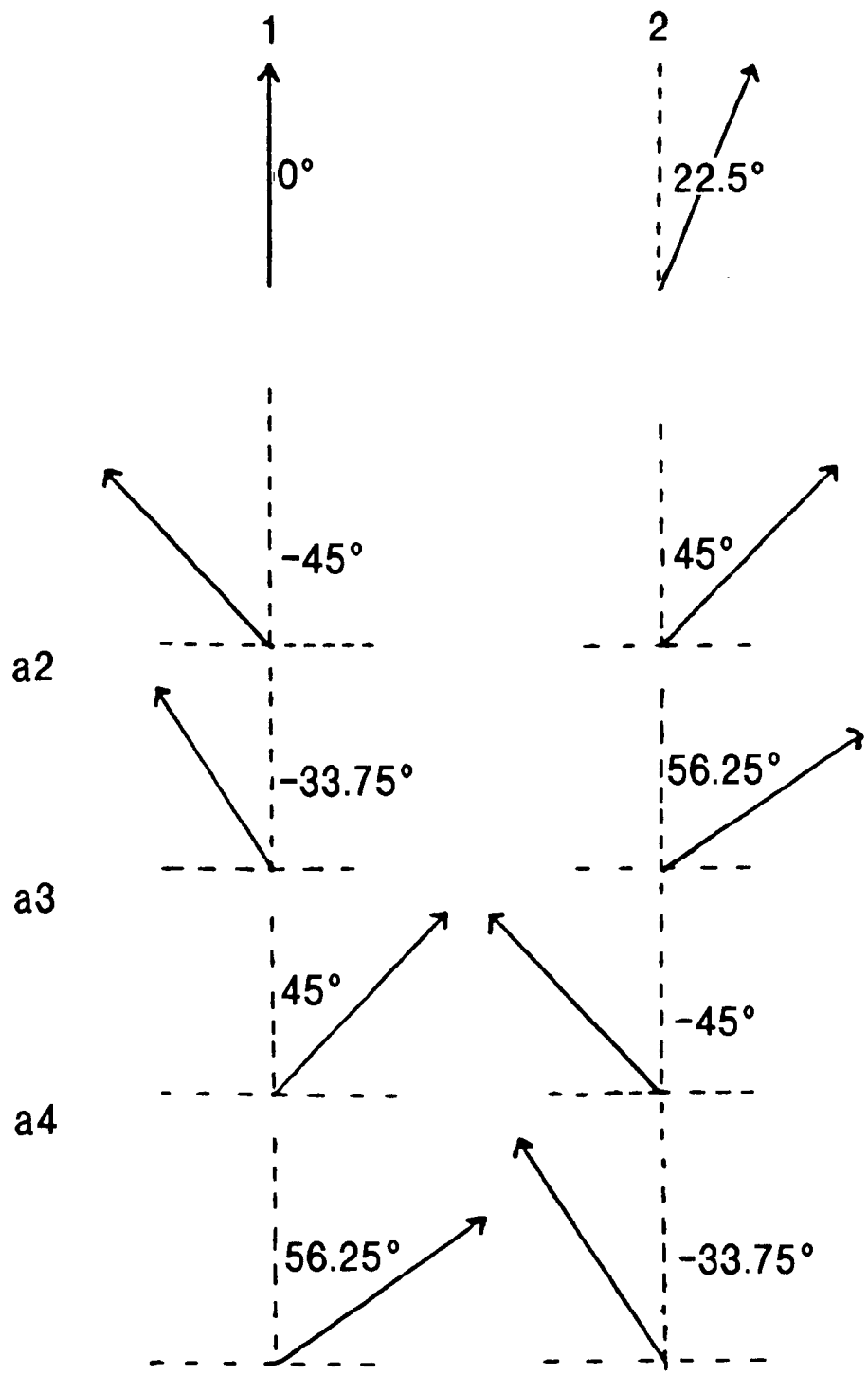
Figure 10:
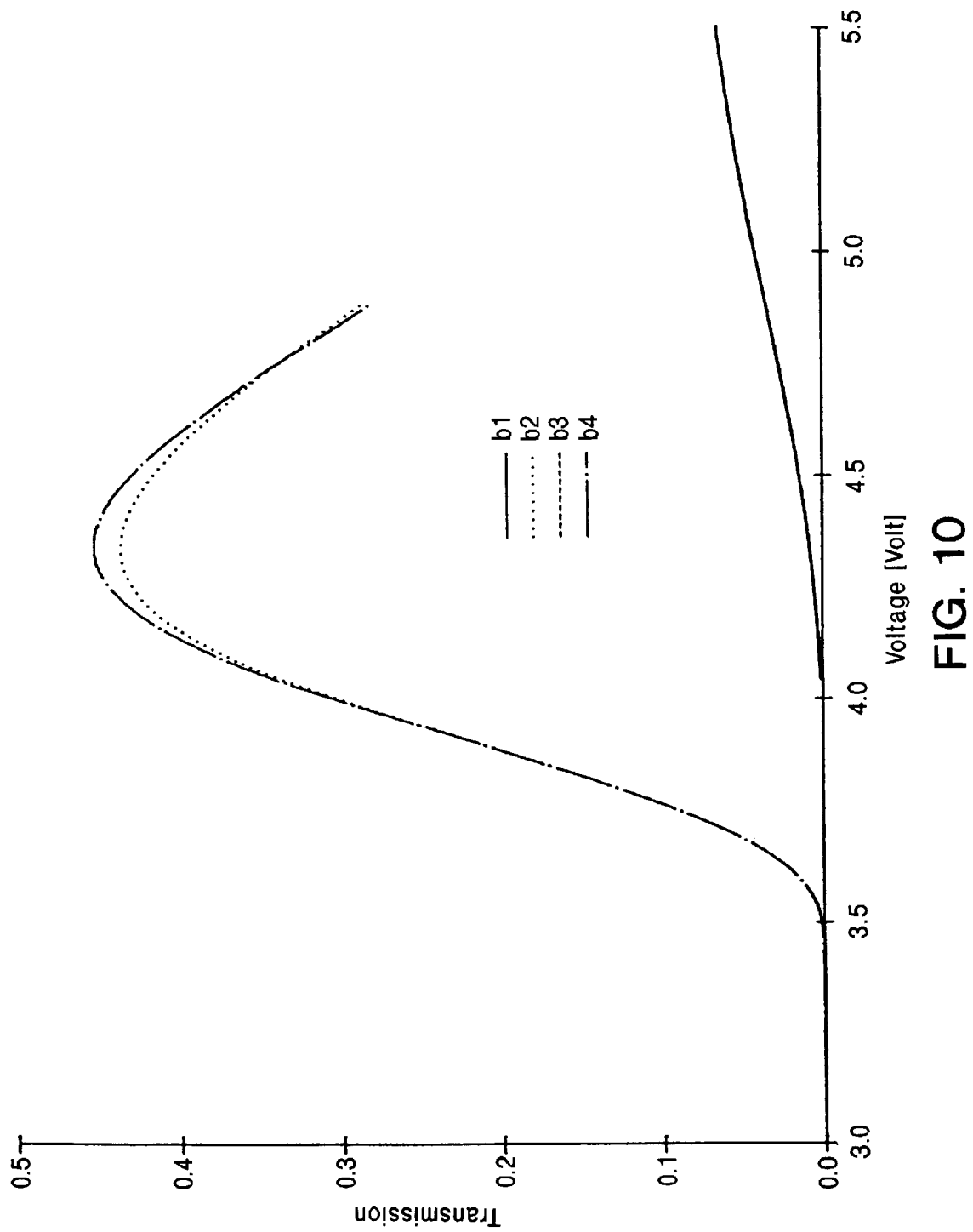

FIG. 9 shows the dependence of the transmission at a wavelength of $\lambda=589$ nm on the polariser setting for an electrooptical system according to the invention containing an ECB liquid-crystal layer. The ECB liquid-crystal layer is on the light-source side and has a twist angle of 22.50° and an optical path difference d $\Delta$n of 1.0 $\mu$m. The compensation layer used is, for example, a uniaxial, optically negative polymer film produced by the process described in EP 0 240 379. The polariser settings investigated are shown in FIG. 10 and designated a1–a4. Conventional, untwisted ECB displays usually have the polariser configuration a1 or a3, while configurations a2 and a4 are given by equation (2) and are used in the systems according to the invention. FIG. 9 shows the transmission as a function of the voltage for the various polariser configurations. It can be seen that the electrooptical systems according to the invention having an optimised polariser configuration have significantly higher transmission than systems having a conventional alignment of the polarisers. By contrast, interchange of the alignment of analyser and polariser has no effect, as shown by a comparison of the electrooptical characteristic lines al and a3 or a2 and a4.

Figure 11:
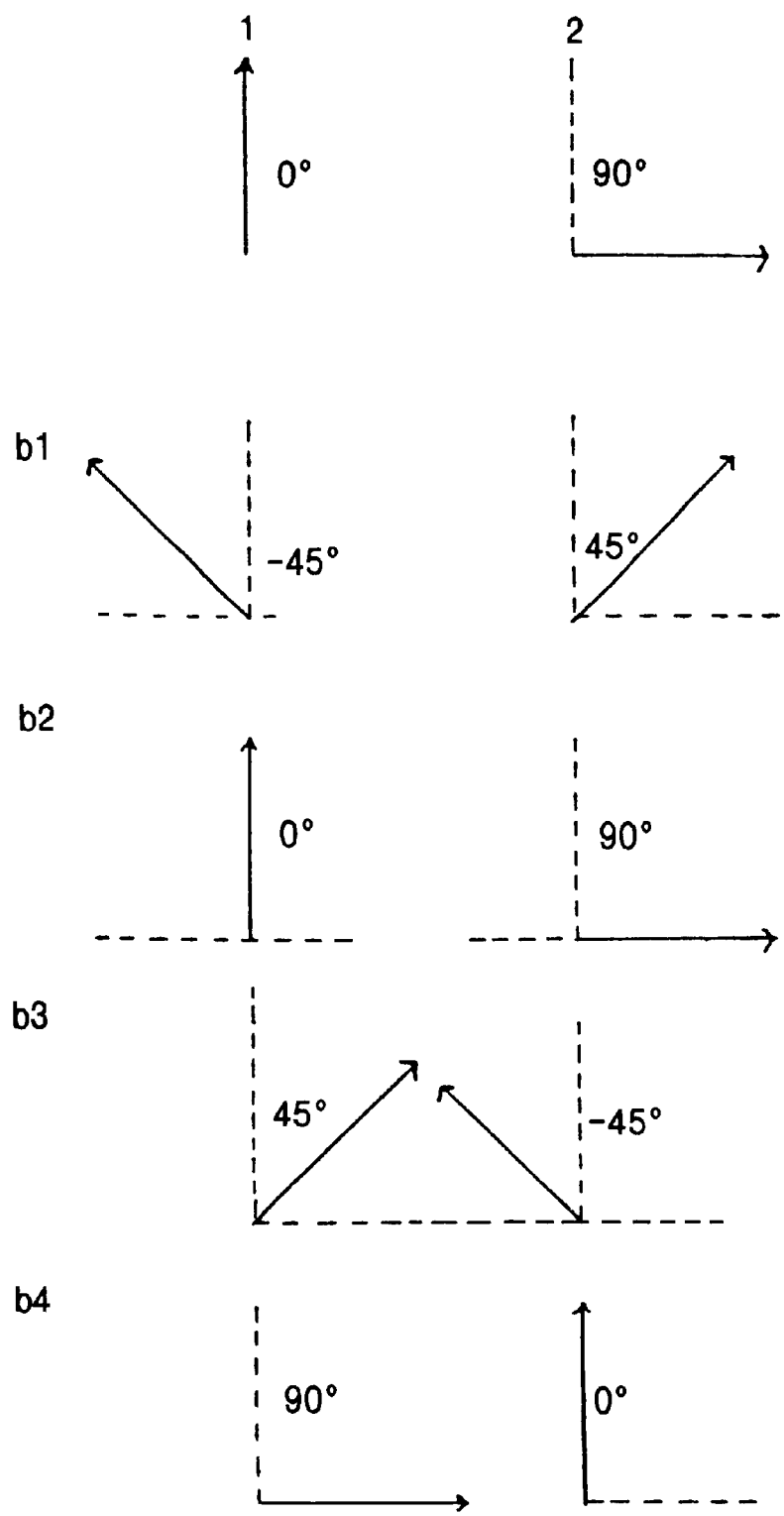
Figure 12:
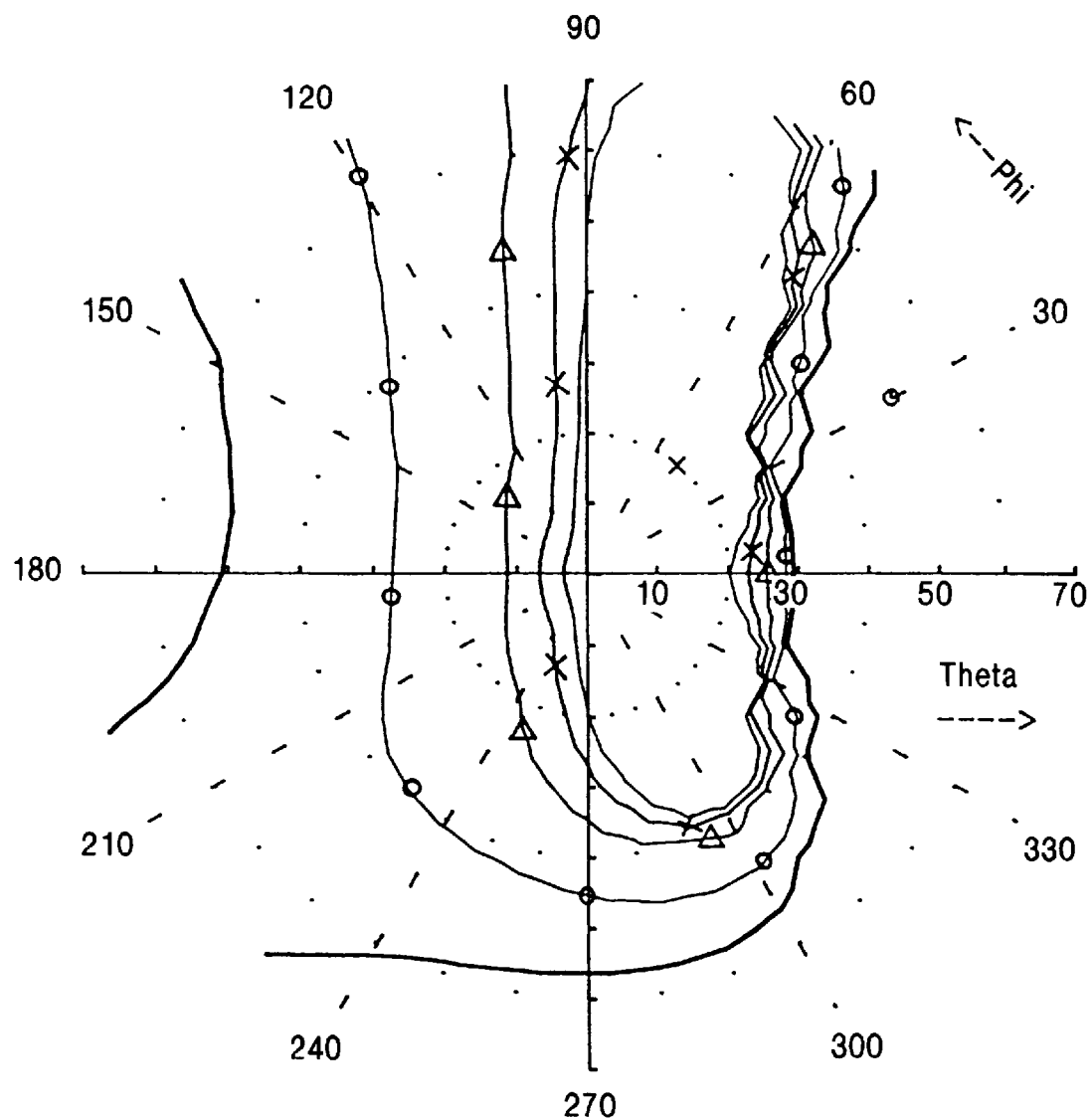

An essentially greater difference in the transmission is observed if an electrooptical system containing an ECB liquid-crystal layer having a twist angle of 90° is drive on the one hand with a conventional polariser configuration and on the other hand with the improved polariser configuration (FIG. 11). The polariser arrangements used are shown in FIG. 12 and designated b1–b4; b1 and b3 are the conventional polariser configurations, and b2 and b4 are the configurations optimised in accordance with the present invention, the arrangement of polariser and analyser being interchanged in each case. Whereas a conventional arrangement results in a dark display, favourable values for the transmission are found in the case of the optimised polariser configuration.

The ECB systems according to the invention are further characterised by favourable values for the viewing angle dependence of the contrast, which is generally only insignificantly affected by the polariser setting.

However, the viewing angle dependence of the contrast can be significantly improved both for conventional ECB systems and for ECB systems according to the invention if the optical path difference both of the liquid-crystal layer used for information display and of the compensation layer is selected at d $\Delta$n$\leq$0.4 $\mu$m and in particular d $\Delta$n$\leq$0.3 $\mu$m. Conventional ECB systems and ECB systems according to the invention having optical path differences of this type are preferred and are a subject-matter of this invention.

Figure 13:
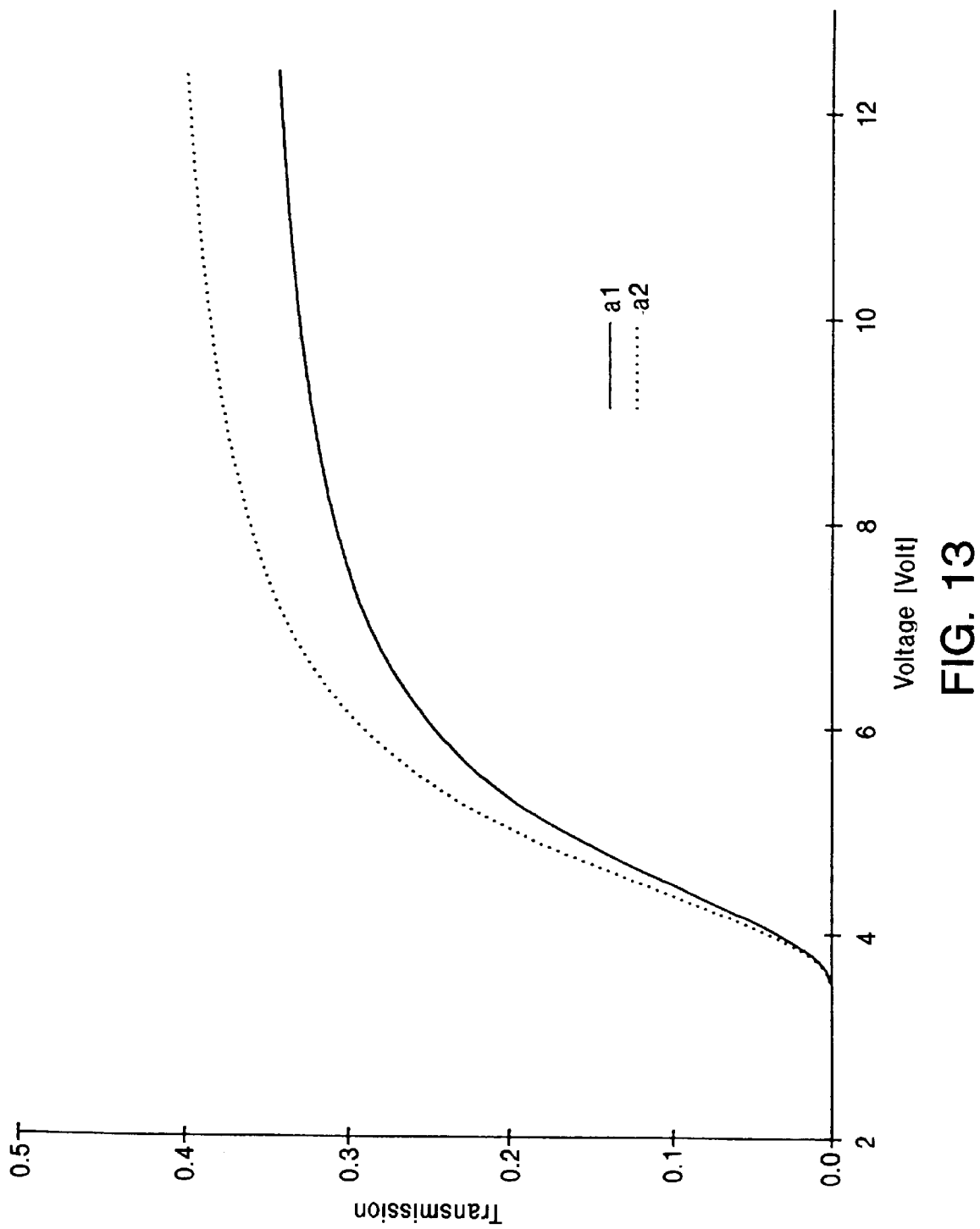

FIG. 13 shows isocontrast curves for a conventional compensated ECB system. The liquid-crystal layer used for information display is untwisted and, like the compensation layer, has an optical path difference d $\Delta$n of 0.28 $\mu$m. The layer thickness of the liquid-crystal layer used for information display is 5 $\mu$m, and the refractive index is $\Delta$n=0.056. The compensation layer used can be, for example, a uniaxial, optically negative polymer film produced by the process described in EP 0 240 379. A polariser is located on both the input side and the output side, with being 45° and the rear polariser being rotated by 90° with respect to the front polariser. Isocontrast lines are shown for contrast values of 5, 10, 20, 30 and 40. FIG. 13 shows that the viewing angle dependence of the contrast for the conventional system described with d $\Delta$n 0.28 is excellent. The viewing angle dependence significantly better than in conventional systems having greater path differences of, for example, 0.6 $\mu$m$\leq$d $\Delta$n$\leq$1.0 $\mu$m.

Figure 14:
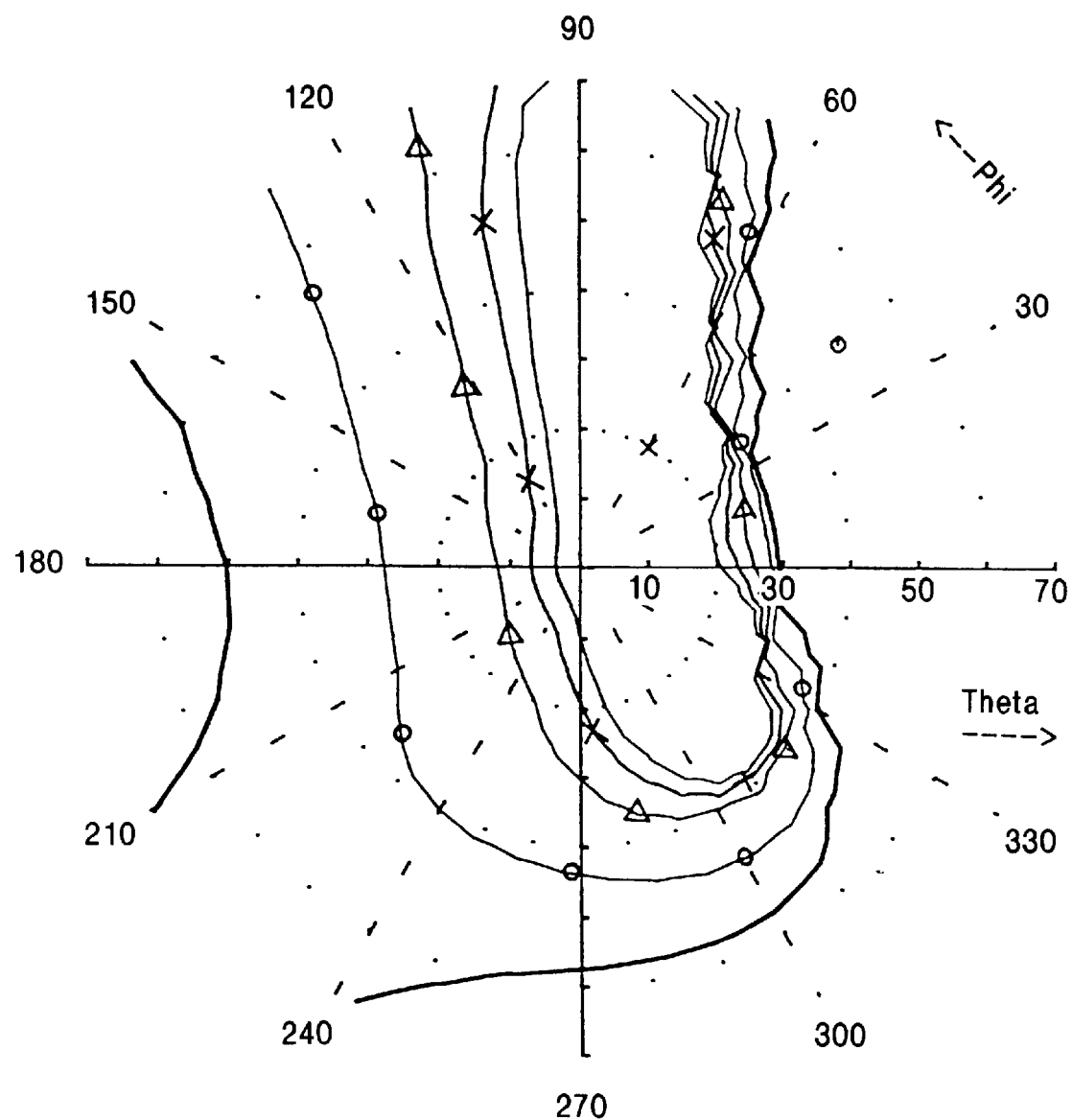
Figure 15:
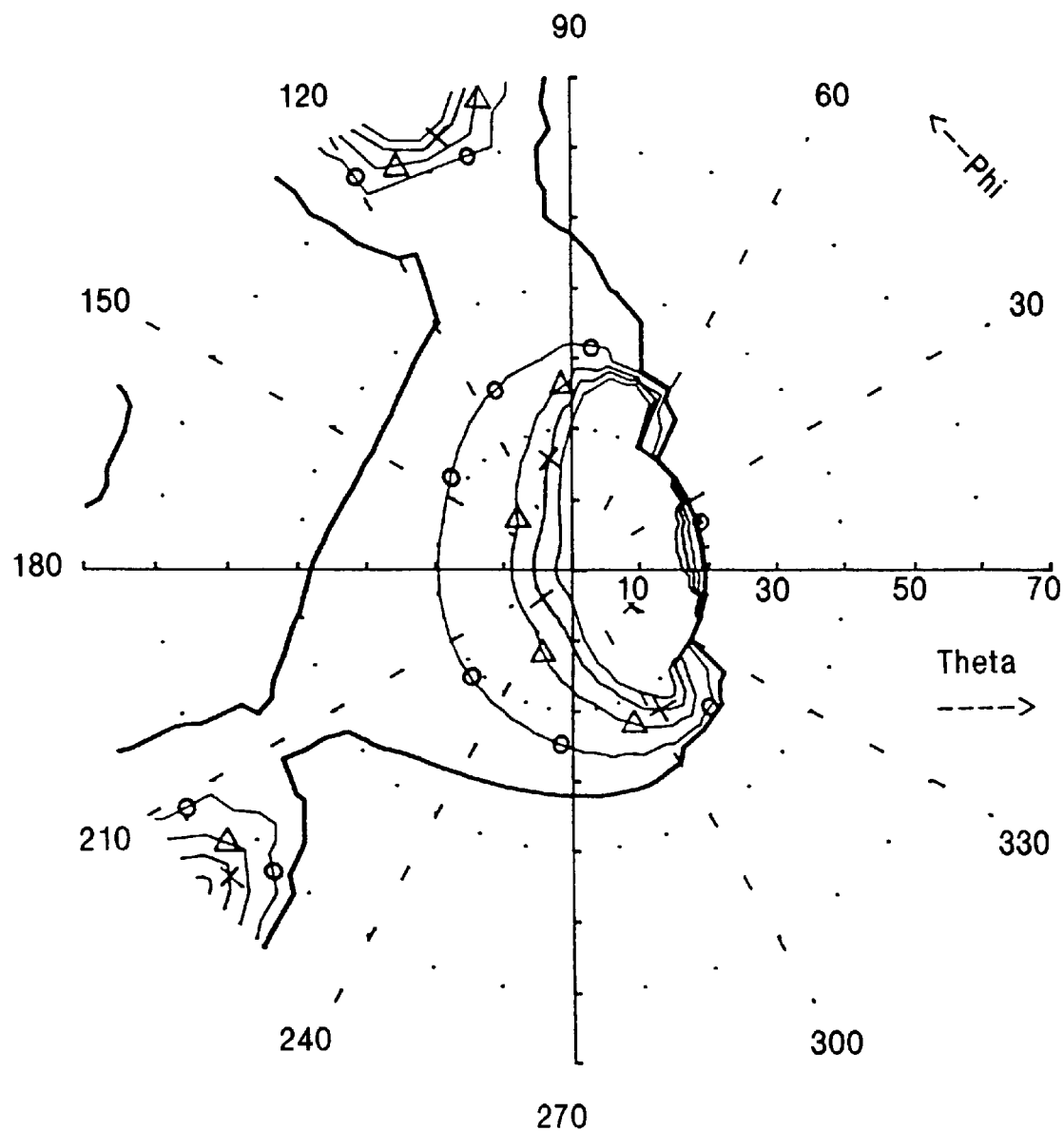

FIG. 14 shows electrooptical characteristic lines for an ECB system according to the invention in which the ECB liquid-crystal layer has a twist angle of 22.5° and an optical path difference d $\Delta$n of 0.28 $\mu$m. The compensation layer used is, for example, a uniaxial, optically negative polymer film. The electrooptical characteristic line designates as a2 in FIG. 14 is obtained at an optimised polariser setting with $\psi=56.25°$, while the curve al corresponds to the conventional polariser arrangement. The isocontrast lines for the optimised system are shown in FIG. 15. A comparison with the isocontrast lines shown in FIG. 16 for the system described in FIG. 9 having a polariser configuration a2 shows that the viewing angle dependence of the contrast can be significantly improved by reducing the optical path difference d $\Delta$n. It can be seen from the electrooptical characteristic lines in FIG. 9 and FIG. 14 that systems having a lower d $\Delta$n have less-steep electrooptical characteristic lines, but this is particularly advantageous in active matrix addressing since the ability to display grey tones is improved.

ECB systems according to the invention having relatively high twist angles of, for example, $\beta=90°$ also show a significant improvement in the viewing angle dependence of the contrast if the optical path difference of the ECB layer is low.

The electrooptical systems according to the invention are distinguished, compared with conventional systems, by improved electrooptical properties and in particular by high contrast and/or high transmission and/or high viewing angle independence of the contrast and/or of the colour values, so that they have considerable economic importance.

Re FIG. 1
 a) twist angle $\beta=22.5°$
    Pretilt angle $\alpha_o=1°$
    Liquid crystalline layer and compensation layer in each case
    8 $\mu$m thick

| Observation angle θ | |
|---|---|
| ○ | 10 Degrees |
| Δ | 20 Degrees |
| + | 30 Degrees |
| × | 45 Degrees |
| ◊ | 60 Degrees |
| ∇ | 80 Degrees | b) twist angle β=22.5°
Pretilt angle $\alpha_o$=1
Liquid crystalline layer and compensation layer in each case
8 μm thick

| Observation angle θ | |
|---|---|
| ○ | 10 Degrees |
| Δ | 20 Degrees |
| + | 30 Degrees |
| × | 45 Degrees |
| ◊ | 60 Degrees |
| ∇ | 80 Degrees |

Figure 2:
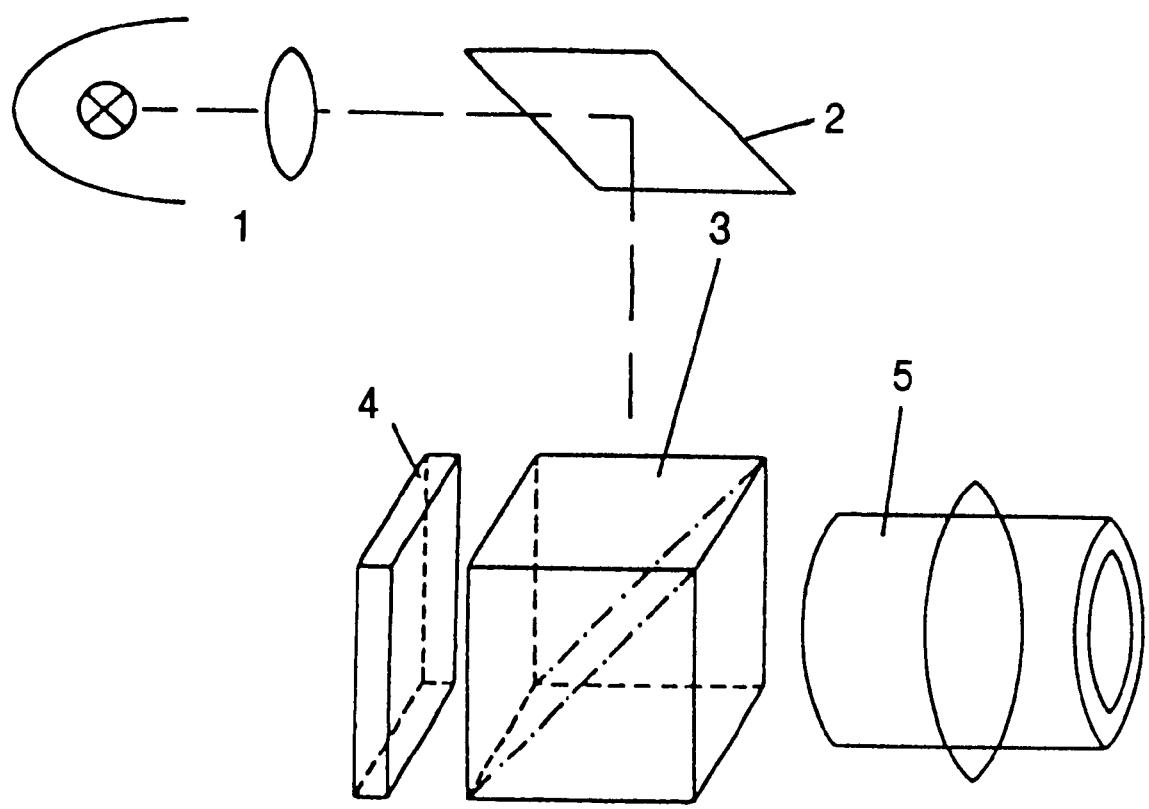

Re FIG. 2
1 Light source
2 Mirror
3 McNeil prism
4 Liquid crystalline cell
5 Projection lens
Re FIG. 3
Twist angle β22.5°
Pretilt angle α=1°
θ=0,ø=0
Wavelength λ=550 nm

| Angle | |
|---|---|
| + | 15.0 Degrees |
| × | 22.5 Degrees |
| ◊ | 30.0 Degrees |
| ∇ | 37.5 Degrees |
| ⊠ | 45.0 Degrees |
| * | 52.5 Degrees |
| ♦ | 56.5 Degrees |

Re FIG. 4
Transmission=f (θ, ø)
Twist=90°, $L_o$=1°, d/p=0.25
Twist=22.5°, $L_o$=1°, d/p=0.0625
a) 1 Conventional TN display
    Layer thickness 8 μm
    Twist angle β=90°
    Angle ψ=0°, polariser and analyser crossed
    Liquid-crystal layer: $U/U_o$=1.1
    Compensation layer: $U/U_o$=0
    Wavelength λ=550 nm
2 Display according to the invention
    Layer thickness 8 μm
    Twist angle β=22.5°
    Angle ψ=56.25
    Liquid-crystal layer: $U/U_o$=1.15
    Compensation layer: $U/U_o$=0
    Wavelength λ=550 nm
Observation angle 0
    ○=10 Degrees
    ×=45 Degrees
b) 1 Conventional TN display
    Layerthickness 8 μm
    Twist angle β=90°
    Angle ψ=0°, polariser and analyser crossed
    Liquid-crystal layer: $U/U_o$=1.18
    Wavelength λ=550 nm
2 Display according to the invention
    Layer thickness 8 μm
    Twist angle β=22.5°
    Angle ψ=56.25°
    Liquid-crystal layer: $U/U_o$=1.3
    Compensation layer $U/U_o$=0
    Wavelength λ=550 nm
Observation angle θ
    ○=10 Degrees
    ×=45 Degrees
Re FIG. 5
1 Preferential direction of the liquid-crystal molecules at the lower substrate plate of the TN liquid-crystal layer
2 Upper polarisation device
3 Preferential direction of the liquid-crystal molecules at the substrate plate of the compensation layer which is adjacent to the lower substrate plate of the TN liquid-crystal layer
4 Lower polarisation device
Re FIG. 7
1 Convention TN display
    Layer thickness 8 μm
    Twist angle β=90°
    Angle ψ=0°, polariser and analyser parallel
    Liquid-crystal layer: $U/U_o$=1.18
    Wavelength λ=650 nm
2 Display according to the invention
    Layer thickness 8 μm
    Twist angle β=22.5°
    Angle ψ=56.25°
    Liquid-crystal layer: $U/U_o$=1.3
    Compensation layer $U/U_o$=0
    Wavelength λ=650 nm
Observation angle θ
    ○=10 Degrees
    Δ=45 Degrees
Re FIG. 8
a) 1 Convention TN display
    Layer thickness 8 μm
    Twist angle β=90°
    Angle ψ=0°, polariser and analyser crossed
    Liquid-crystal layer: $U/U_o$=1.1
    Compensation layer: $U/U_o$=0
    Wavelength λ=550 nm
2 Display according to the invention
    Layer thickness 8 μm
    Twist angle β=22.5°
    Angle ψ=56.25°
    Liquid-crystal layer: $U/U_o$=1.15
    Compensation layer $U/U_o$=0

Wavelength λ=550 nm
Observation angle θ
  ○=10 Degrees
  Δ=45 Degrees
b) 1 Convention N display
  Layer thickness 8 μm
  Twist angle β=90°
  Angle ψ=0°, polariser and analyser parallel
  Liquid-crystal layer: U/U$_o$=1.2
  Compensation layer: U/U$_o$=0
  Wavelength λ=550 nm
  2 Display according to the invention
  Layer thickness 8 μm
  Twist angle β=22.5°
  Angle ψ=56.25°
  Liquid-crystal layer: U/U$_o$=1.3
  Compensation layer U/U$_o$=0
  Wavelength λ=550 nm
Observation angle θ
  ○=10 Degrees
  Δ=45 Degrees
Re FIG. 10
Top Preferential direction of the liquid-crystalline molecules at the substrate plates of the ECB layer
  1 Preferential direction of the liquid-crystalline molecules at the lower substrate plate of the ECB liquid-crystalline layer
  2 Preferential direction of the liquid-crystalline molecules at the upper substrate of the ECB liquid-crystalline layer a1, a2, a3, a4: Polariser configuration Angle ψ
Re FIG. 12
Top: Preferential direction of the liquid-crystalline molecules at the substrate plates of the ECB layer
  1 Preferential direction of the liquid-crystalline molecules at the lower substrate plate of the ECB liquid-crystalline layer
  2 Preferential direction of the liquid-crystalline molecules at the upper substrate of the ECB liquid-crystalline layer b1, b2, b3, b4: Polariser configuration Angle ψ
Re FIG. 13

| Contrast (589 nm) | |
|---|---|
| — | 5.000 |
| ○ | 10.000 |
| Δ | 20.000 |
| × | 30.000 |
| — | 40.000 |

Re FIG. 15

| Contrast (589 nm) | |
|---|---|
| — | 5.000 |
| ○ | 10.000 |
| Δ | 20.000 |
| × | 30.000 |
| — | 40.000 |
| Min. (○) | 0.04690 |
| Max. (×) | 2603.25561 |

Figure 16:
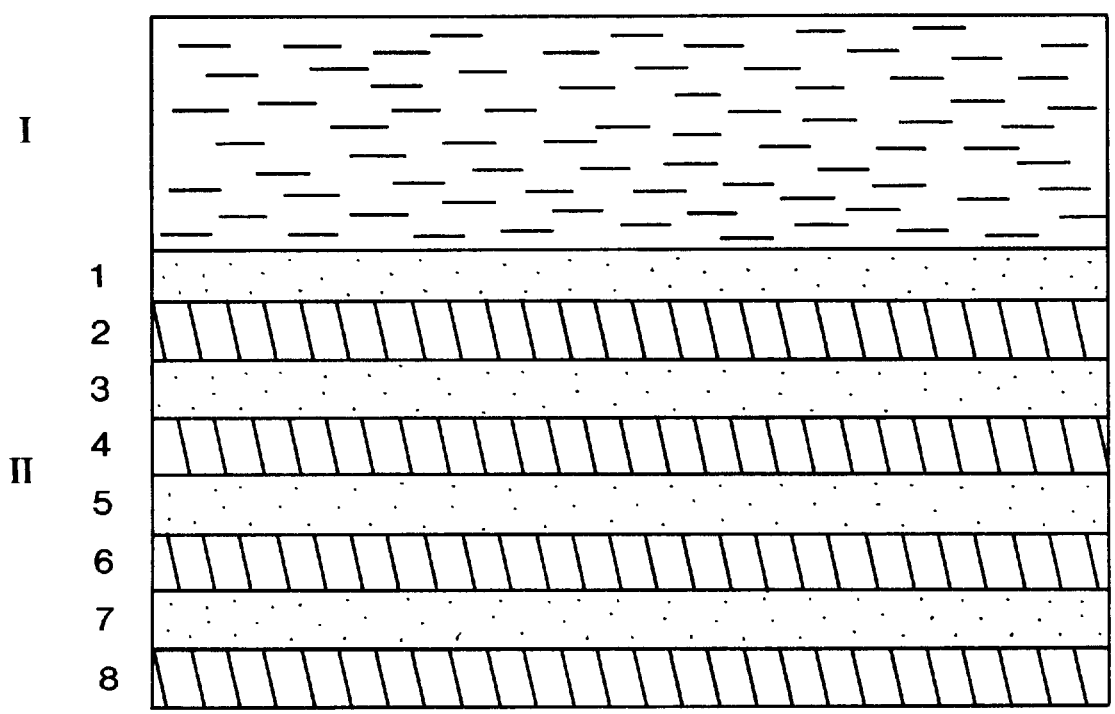

Re FIG. 16

| Contrast (589 nm) | |
|---|---|
| — | 5.000 |
| ○ | 10.000 |
| Δ | 20.000 |
| × | 30.000 |
| — | 40.000 |

Re FIG. 17
Approximation of an optically negative compensation layer by a stack of optically positive liquid-crystal layers with different alignments
I addressable liquid-crystal layer
  twist angle β=0°
  homogeneous alignment (α=1°)
  thickness d=8 μm
II compensation layer
  1, 3, 5, 7: twist angle β=0°
    homogeneous alignment (=1°)
    thickness d=2 μm
  2, 4, 6, 8: homeotropic alignment (α=89°)
    twist angle β=0°
    thickness d 2 μm
Re FIG. 18
Transmission I as a function of the birefringence n of the addressed layer for a system according to the invention containing an optically negative compensation layer corresponding to FIG. 17
addressable liquid-crystal layer: twist angle β=0°
  pretile angle α=1°
  thickness d=8 μm
compensation layer: structure as in FIG. 17
  thickness of the individual layers d=1 μm
angle ψ=45°
angle φ=135°
wavelength λ=550 nm
Observation angle θ
  ○=0 Degrees
  ▲=10 Degrees
  +=20 Degrees
  ×=30 Degrees
  ◊ 45 Degrees
  ▽=60 Degrees
  ■=80 Degrees
Re FIG. 19
System according to the invention containing a tilted, optically negative compensation layer
  addressable liquid-crystal layer: twist angle β0°
    homogeneous alignment (α=1°)
    d=8 μm
    U/U$_o$=1.1
  compensation layer: angle τ=15°
    thickness d 8 μm
    twist angle β=180°
    n$_{min}$=1.5000
  the two other refractive indices are each 1.5527
  angle ψ=45°
  wavelength λ=550 nm
Observation angle θ
  ○=10 Degrees
  Δ=20 Degrees +=30 Degrees
x=45 Degrees
◇=60 Degrees
▽=80 Degrees
Re FIG. 20
as for FIG. 19, but $U/U_o=1.3$ selected for the addressable liquid-crystal layer.
Observation angle θ
○=10 Degrees
Δ=20 Degrees
+=30 Degrees
x=45 Degrees
◇=60 Degrees
▽=80 Degrees
Re FIG. 21
Electrooptical characteristic line for the electrooptical system described in FIG. 19.
Re FIG. 22
Illustrates various conventional definitions.

What is claimed is:

1. An electrooptical system containing:
   (a) a twisted nematic liquid-crystal layer having a director, with an input side and an output side, which is positioned between a first substrate and a second substrate, each of whose inside surface is provided with an electrode coating and an alignment layer thereon, the director of said liquid crystal layer having a parallel edge alignment and a twist angle of $0° \leq \beta \leq 100°$,
   (b) at least one compensation layer for compensating an optical path difference of the liquid-crystal layer d·Δn, and
   (c) at least one device for linear polarization of light in such an arrangement that light, before entering and after exiting the liquid-crystal layer, passes through a polarization device,
      I. wherein, in order to achieve high contrast, and/or high brightness, and/or high viewing angle independence of the contrast and/or the color values, the angle ψ, which the polarization device on the input side of the liquid crystal layer forms with the director of the liquid-crystal layer on the surface of the first substrate, satisfies
      I.A. condition (1) or (2)

$$\psi=(\beta+90°)/2\pm10° \quad (1)$$

$$\psi=\beta/2\pm10° \quad (2)$$

where a polarization device is present on both the light input side of the liquid crystal layer and the light output side of the liquid crystal layer, and the polarization device on the output side of the liquid crystal layer is rotated by 90±10° with respect to the polarization device on the input side of the liquid crystal layer, and, optionally, alignment of the polarization devices on the input side and the output side of the liquid crystal layer are interchanged, or satisfies
      I.B. condition (3) or (4)

$$30°\leq\psi\leq70° \text{ for } 0\leq\beta\leq45° \quad (3)$$

$$35°\leq\psi\leq90° \text{ for } 45\leq\beta\leq100° \quad (4),$$

where a polarization device is only present on the input side,
      II. wherein the compensation layer comprises a material having three optical refractive indices, of which one is less than the other two, and wherein the optical axis corresponding to this lowest refractive index is essentially parallel to the surface of said second substrate or forms an angle of $2°<\gamma<60°$ with the surface of said second substrate,
         as a result of which, the angle between the optical axis of the compensation layer and the optical axis of the liquid-crystal layer, upon application of a voltage, passes through a minimum, and
      III. wherein the plane set up by the two other refractive indices forms an angle of between 30° and 150° with the director of the liquid-crystal at the surface of the second substrate.

2. A system according to claim 1 wherein the liquid-crystal layer has a twist angle of $0<\beta<90°$.

3. A system according to claim 1, wherein the twist angle is $5°\leq\beta\leq60°$.

4. A system according to claim 1, which contains only one polarization device and at least one reflector.

5. A projection device containing a system according to claim 1.

6. A system according to claim 2 which contains only one polarization device and at least one reflector.

7. An electrooptical system according to claim 6 wherein the liquid crystal has, in order to improve the viewing angle dependence of the contrast, an optical path difference d·Δn of $\leq 0.40$ μm.

* * * * *

UNITED STATES PATENT AND TRADEMARK OFFICE
CERTIFICATE OF CORRECTION

PATENT NO. : 6,327,010 B1
DATED : December 4, 2001
INVENTOR(S) : Scheuble et al.

It is certified that error appears in the above-identified patent and that said Letters Patent is hereby corrected as shown below:

Column 4,
Line 44, change "FIG. 22" to -- FIG. 21 --.

Column 5,
Line 21, change "(FIG. 22b)" to -- (FIG. 21b) --.
Line 26, change "(FIG. 22a)" to -- (FIG. 21a) --.

Column 8,
Line 5, change "FIG. 17" to -- FIG. 16 --.
Line 20, change "(see FIG. 17)" to -- (see FIG. 16) --.
Line 21, change "FIG. 17" to -- FIG. 16 --.
Line 35, change "FIG. 17" to -- FIG. 16 --.
Line 39, change "FIG. 18" to -- FIG. 17 --.
Line 58, change "FIG. 17" to -- FIG. 16 --.

Column 9,
Line 1, change "FIG. 17" to -- FIG. 16 --.
Line 34, change "FIG. 17" to -- FIG. 16 --.
Line 39, change "FIG. 17" to -- FIG. 16 --.
Line 41, change "(FIG. 17)" to -- (FIG. 16) --.

Column 10,
Line 66, change "FIG. 19" to -- FIG. 18 --.

Column 11,
Line 19, change "FIG. 19" to -- FIG. 18 --.
Line 19, change "FIG. 20" to -- FIG. 19 --.
Line 20, change "FIG. 19" to -- FIG. 18 --.
Line 27, change "FIG. 21" to -- FIG. 20 --.
Line 28, change "FIG. 19" to -- FIG. 18 --.
Line 40, change "FIG. 19" to -- FIG. 18 --.

Figure 7A:
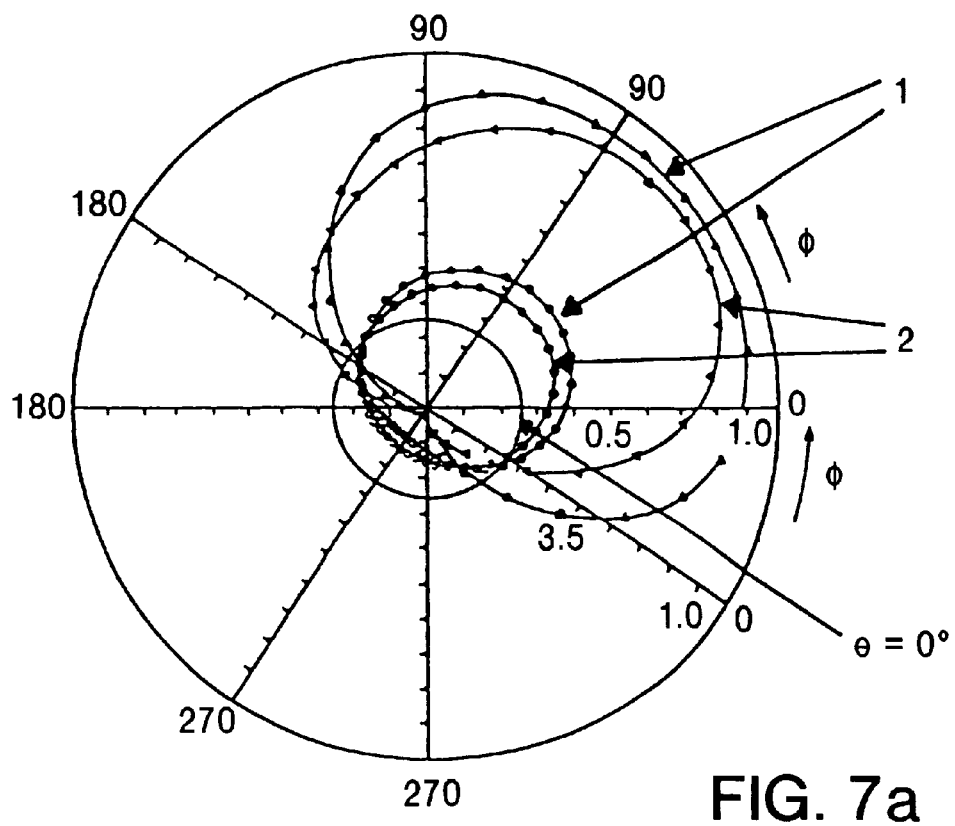
Figure 7B:
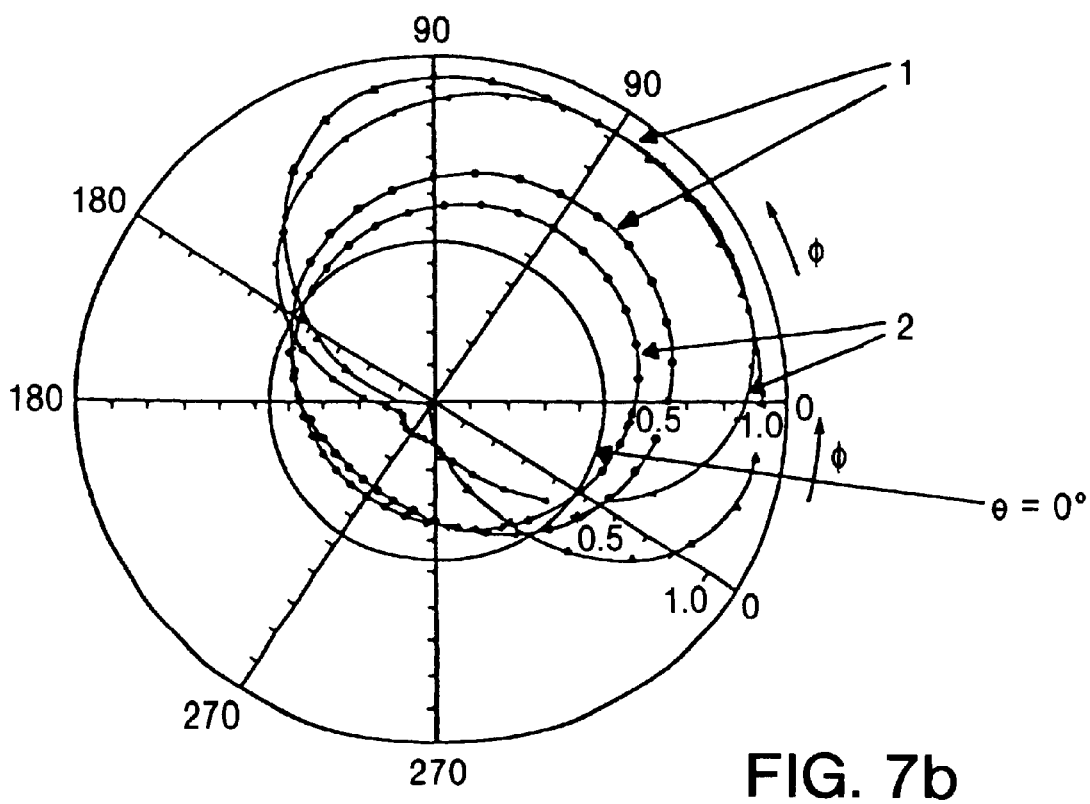
Figure 8:
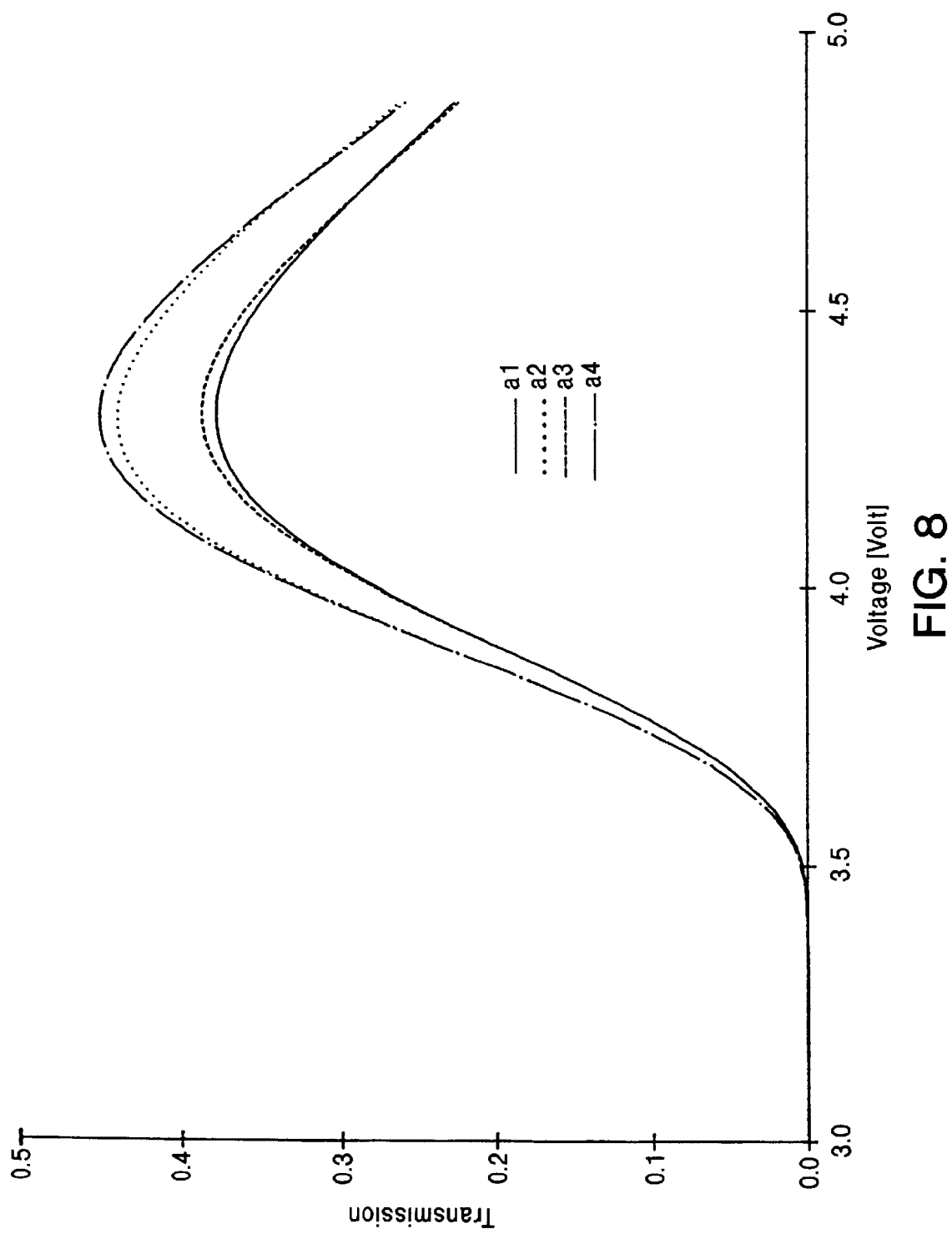

Column 15,
Line 8, change "FIGS. 8a and 8b" to -- FIGS. 7a and 7b --.
Line 14, change "FIG. 8a" to -- FIG. 7a --.
Line 17, change "FIG. 8b" to -- FIG. 7b --.
Line 20, change "FIGS. 8a and 8b" to -- FIGS. 7a and 7b --.
Line 24, change "FIG. 9" to -- FIG. 8 --.
Line 32, change "FIG. 10" to -- FIG. 9 --.

UNITED STATES PATENT AND TRADEMARK OFFICE
CERTIFICATE OF CORRECTION

PATENT NO.      : 6,327,010 B1
DATED           : December 4, 2001
INVENTOR(S)     : Scheuble et al.

It is certified that error appears in the above-identified patent and that said Letters Patent is hereby corrected as shown below:

Column 15, (cont'd)
Line 36, change "FIG. 9" to -- FIG. 8 --.
Line 51, change "(FIG. 11)" to -- (FIG. 10) --.
Line 52, change "FIG. 12" to -- FIG. 11 --.

Column 16,
Line 8, change "FIG. 13" to -- FIG. 12 --.
Line 20, change "FIG. 13" to -- FIG. 12 --.
Line 26, change "FIG. 14" to -- FIG. 13 --.
Line 32, change "FIG. 14" to -- FIG. 13 --.
Line 35, change "FIG. 15" to -- FIG. 14 --.
Line 36, change "FIG. 16" to -- FIG. 15 --.
Line 37, change "FIG. 9" to -- FIG. 8 --.
Line 41, change "FIG. 9" to -- FIG. 8 --.
Line 41, change "FIG. 14" to -- FIG. 13 --.

Column 18,
Line 31, change "FIG. 7" to -- FIG. 6 --.
Line 48, change "FIG. 8" to -- FIG. 7 --.

Column 19,
Line 22, change "FIG. 10" to -- FIG. 9 --.
Line 31, change "FIG. 12" to -- FIG. 11 --.
Line 44, change "FIG. 13" to -- FIG. 12 --.
Line 55, change "FIG. 15" to -- FIG. 14 --.

Column 20,
Line 1, change "FIG. 16" to -- FIG. 15 --.
Line 12, change "FIG. 17" to -- FIG. 16 --.
Line 27, change "FIG. 18" to -- FIG. 17 --.
Line 31, change "FIG. 17" to -- FIG. 16 --.
Line 35, change "FIG. 17" to -- FIG. 16 --.
Line 48, change "FIG. 19" to -- FIG. 18 --.

Column 21,
Line 5, change "FIG. 20" to -- FIG. 19 --.
Line 6, change "FIG. 19" to -- FIG. 18 --.
Line 15, change "FIG. 21" to -- FIG. 20 --.

UNITED STATES PATENT AND TRADEMARK OFFICE
CERTIFICATE OF CORRECTION

PATENT NO. : 6,327,010 B1
DATED : December 4, 2001
INVENTOR(S) : Scheuble et al.

It is certified that error appears in the above-identified patent and that said Letters Patent is hereby corrected as shown below:

Column 21, (cont'd)
Line 17, change "FIG. 19" to -- FIG. 18 --.
Line 18, change "FIG. 22" to -- FIG. 21 --.

Signed and Sealed this

First Day of April, 2003

JAMES E. ROGAN
*Director of the United States Patent and Trademark Office*